United States Patent
Davis

(10) Patent No.: US 10,991,240 B2
(45) Date of Patent: Apr. 27, 2021

(54) ELECTRONIC ACCESS CONTROL BASED ON OPTICAL CODES

(71) Applicant: Videx, Inc., Corvallis, OR (US)

(72) Inventor: Paul R. Davis, Corvallis, OR (US)

(73) Assignee: Videx, Inc., Corvallis, OR (US)

( * ) Notice: Subject to any disclaimer, the term of this patent is extended or adjusted under 35 U.S.C. 154(b) by 0 days.

(21) Appl. No.: 16/858,438

(22) Filed: Apr. 24, 2020

(65) Prior Publication Data

US 2020/0258378 A1  Aug. 13, 2020

Related U.S. Application Data

(60) Continuation of application No. 15/809,917, filed on Nov. 10, 2017, now Pat. No. 10,643,461, which is a
(Continued)

(51) Int. Cl.
*G08C 23/04* (2006.01)
*G07C 9/00* (2020.01)
(Continued)

(52) U.S. Cl.
CPC .......... *G08C 23/04* (2013.01); *G06F 1/3287* (2013.01); *G07C 9/00174* (2013.01); *G07C 9/28* (2020.01);
(Continued)

(58) Field of Classification Search
CPC .. G08C 23/04; H04W 12/08; H04W 12/0608; H04W 12/0802; H04W 4/14;
(Continued)

(56) References Cited

U.S. PATENT DOCUMENTS 4,727,368 A   2/1988 Larson et al.
5,602,536 A   2/1997 Henderson et al.
(Continued)

FOREIGN PATENT DOCUMENTS

CN   102542640 A   7/2012

OTHER PUBLICATIONS

International Search Report and Written Opinion of the International Searching Authority issued in International Application No. PCT/US2016/056203 dated Feb. 24, 2017; 18 pages.
(Continued)

*Primary Examiner* — Abbas H Alagheband
(74) *Attorney, Agent, or Firm* — Matthew D. Eskue

(57) ABSTRACT

Methods and systems relating to administration of authentication information for electronic access control are disclosed. Authentication information is conveyed to an electronic locking device configured to restrict access to an entry point. In various embodiments, a smart device comprises a display screen for presenting a machine-readable optical code comprising encoded authentication information. An image sensor of the electronic locking device can decode the machine-readable optical code to obtain the authentication information. The electronic locking device is configured to permit access to the entry point in response to the image sensor detecting a machine-readable optical code corresponding to an access credential. A server device can provide authentication information to the smart device based on an access criterion. Conveying authentication information to the locking device may include rendering a webpage comprising the machine-readable optical code corresponding to the access credential.

14 Claims, 16 Drawing Sheets

Related U.S. Application Data division of application No. 15/289,116, filed on Oct. 7, 2016, now Pat. No. 9,847,020.

(60) Provisional application No. 62/239,884, filed on Oct. 10, 2015.

(51) Int. Cl.

| | |
|---|---|
| *G07C 9/28* | (2020.01) |
| *H04W 12/06* | (2021.01) |
| *H04W 12/08* | (2021.01) |
| *G06F 1/3287* | (2019.01) |
| *H04L 29/06* | (2006.01) |
| *H04W 4/14* | (2009.01) |
| *H04W 4/80* | (2018.01) |
| *H04W 4/02* | (2018.01) |
| *H04W 4/90* | (2018.01) |
| *H04W 4/70* | (2018.01) |
| *H04W 12/00* | (2021.01) |
| *H04B 10/2513* | (2013.01) |
| *H04W 84/12* | (2009.01) |

(52) U.S. Cl.
CPC ............... *H04L 63/10* (2013.01); *H04W 4/14* (2013.01); *H04W 12/0608* (2019.01); *H04W 12/08* (2013.01); *H04W 12/0802* (2019.01); *G07C 9/00182* (2013.01); *G07C 9/00571* (2013.01); *G07C 2009/00785* (2013.01); *G07C 2009/00841* (2013.01); *G07C 2009/00865* (2013.01); *G07C 2209/62* (2013.01); *H04B 10/2513* (2013.01); *H04W 4/027* (2013.01); *H04W 4/70* (2018.02); *H04W 4/80* (2018.02); *H04W 4/90* (2018.02); *H04W 12/00504* (2019.01); *H04W 12/06* (2013.01); *H04W 84/12* (2013.01)

(58) Field of Classification Search
CPC ............ H04W 12/06; H04W 12/00504; H04W 4/027; H04W 4/90; H04W 4/70; H04W 84/12; H04W 4/80; G07C 9/28; G07C 9/00174; G07C 9/00182; G07C 9/00571; G07C 2009/00785; G07C 2009/00841; G07C 2009/00865; G07C 2209/62; G07C 2009/00349; G07C 2009/00373; G07C 9/00309; G06F 1/3287; H04L 63/10; H04B 10/2513
USPC ........... 398/58; 370/329, 331, 338, 355, 401
See application file for complete search history.

(56) References Cited

U.S. PATENT DOCUMENTS

| | | | |
|---|---|---|---|
| 6,175,434 B1 | 1/2001 | Feng | |
| 6,989,732 B2 | 1/2006 | Fisher | |
| 7,012,503 B2 | 3/2006 | Nielsen | |
| 7,315,823 B2 | 1/2008 | Brondrup | |
| 7,481,363 B2 | 1/2009 | Zuili | |
| 7,606,558 B2 | 10/2009 | Despain et al. | |
| 7,636,340 B2 | 12/2009 | Black et al. | |
| 7,706,778 B2 | 4/2010 | Lowe | |
| 8,037,511 B1 | 10/2011 | Lundy et al. | |
| 8,056,802 B2 | 11/2011 | Gressel et al. | |
| 8,093,988 B2 | 1/2012 | Takene et al. | |
| 8,261,979 B2 | 9/2012 | Gressel et al. | |
| 8,368,507 B2 | 2/2013 | Conreux et al. | |
| 8,437,740 B2 | 5/2013 | Despain et al. | |
| 8,521,034 B2 | 8/2013 | Rajagopal et al. | |
| 8,679,014 B2 | 3/2014 | Bennett et al. | |
| 8,682,245 B2 | 3/2014 | Fyke et al. | |
| 8,774,784 B2 | 7/2014 | Kader | |
| 8,793,784 B2 | 7/2014 | Metivier et al. | |
| 8,797,138 B2 | 8/2014 | Myers et al. | |
| 8,902,040 B2 | 12/2014 | Greisen et al. | |
| 9,077,716 B2 | 7/2015 | Myers et al. | |
| 9,087,246 B1 | 7/2015 | Chin et al. | |
| 9,158,892 B2* | 10/2015 | Levy | G06F 17/00 |
| 9,294,198 B2 | 3/2016 | Pederson | |
| 9,305,412 B2 | 4/2016 | Winkelman | |
| 9,390,256 B2 | 7/2016 | Jakobsson et al. | |
| 9,478,084 B1* | 10/2016 | Robinson | G07C 9/38 |
| 9,501,881 B2 | 11/2016 | Saeedi et al. | |
| 9,524,594 B2 | 12/2016 | Ouyang et al. | |
| 9,544,066 B2 | 1/2017 | Fink et al. | |
| 9,600,645 B2* | 3/2017 | Fadell | G08B 3/10 |
| 9,648,003 B2* | 5/2017 | Lund | H04L 63/10 |
| 9,681,468 B2 | 6/2017 | Lee et al. | |
| 9,690,272 B2 | 6/2017 | Chin et al. | |
| 9,690,959 B2 | 6/2017 | Chin et al. | |
| 9,749,954 B2 | 8/2017 | Debates et al. | |
| 9,841,743 B2 | 12/2017 | Davis | |
| 9,894,066 B2* | 2/2018 | Conrad | H04L 63/123 |
| 10,096,183 B2* | 10/2018 | Nitu | H04W 4/80 |
| 10,115,256 B2 | 10/2018 | Davis | |
| 10,554,758 B2* | 2/2020 | Barry | G08B 25/10 |
| 2002/0180582 A1 | 12/2002 | Nielsen | |
| 2003/0160681 A1 | 8/2003 | Menard et al. | |
| 2004/0002365 A1 | 1/2004 | Ota et al. | |
| 2006/0073855 A1 | 4/2006 | Booking et al. | |
| 2006/0250578 A1 | 11/2006 | Pohl et al. | |
| 2007/0296545 A1 | 12/2007 | Clare | |
| 2008/0296912 A1 | 12/2008 | Whitner et al. | |
| 2009/0100063 A1 | 4/2009 | Bengtsson et al. | |
| 2009/0324025 A1 | 12/2009 | Camp, Jr. et al. | |
| 2010/0141381 A1 | 6/2010 | Bliding et al. | |
| 2011/0001603 A1 | 1/2011 | Willis | |
| 2011/0272430 A1 | 11/2011 | Muderlak et al. | |
| 2011/0311052 A1 | 12/2011 | Myers et al. | |
| 2011/0320998 A1 | 12/2011 | Perry et al. | |
| 2012/0001567 A1 | 1/2012 | Knapp et al. | |
| 2012/0077468 A1 | 3/2012 | Fan et al. | |
| 2012/0102155 A1 | 4/2012 | Roh | |
| 2012/0280783 A1 | 11/2012 | Gerhardt et al. | |
| 2012/0303768 A1 | 11/2012 | Fiennes | |
| 2013/0183042 A1 | 7/2013 | Knapp et al. | |
| 2013/0324171 A1 | 12/2013 | Redmond | |
| 2014/0029495 A1 | 1/2014 | Ise | |
| 2014/0113592 A1 | 4/2014 | Wu et al. | |
| 2014/0168506 A1 | 6/2014 | Kasahara | |
| 2014/0195810 A1 | 7/2014 | Metivier et al. | |
| 2014/0373123 A1 | 12/2014 | Kang | |
| 2014/0375422 A1 | 12/2014 | Huber et al. | |
| 2015/0107316 A1 | 4/2015 | Kirkjan | |
| 2015/0142461 A1 | 5/2015 | Darty | |
| 2015/0145643 A1* | 5/2015 | Fadell | G08B 27/003 340/5.51 |
| 2015/0145648 A1 | 5/2015 | Winkelman | |
| 2015/0186765 A1 | 7/2015 | Osborne | |
| 2015/0199859 A1 | 7/2015 | Ouyang et al. | |
| 2015/0228133 A1 | 8/2015 | Capaldi-Tallon | |
| 2015/0262195 A1* | 9/2015 | Bergdale | G07C 9/29 705/5 |
| 2015/0267438 A1 | 9/2015 | Martinez et al. | |
| 2015/0287256 A1 | 10/2015 | Davis | |
| 2016/0012428 A1 | 1/2016 | Haldenby et al. | |
| 2016/0099774 A1 | 4/2016 | Sim et al. | |
| 2016/0117544 A1 | 4/2016 | Hoyos et al. | |
| 2016/0150411 A1 | 5/2016 | Liu et al. | |
| 2016/0171859 A1 | 6/2016 | Bowlus | |
| 2016/0180618 A1 | 6/2016 | Ho et al. | |
| 2016/0241999 A1* | 8/2016 | Chin | G08C 23/04 |
| 2016/0248505 A1 | 8/2016 | Cha | |
| 2016/0328898 A1 | 11/2016 | Robinson | |

(56) References Cited

U.S. PATENT DOCUMENTS

2017/0004475 A1* 1/2017 White .................... G07G 1/009
2018/0262908 A1 9/2018 Yeom

OTHER PUBLICATIONS

Miriam M. Galal et al., "Smartphones for Payments and Withdrawals Utilizing Embedded LED Flashlight for High Speed Data Transmission", 2013 Fifth International Conference on Computational Intelligence, Communication Systems and Networks (CICSyN 2013), Jun. 5, 2013, pp. 63-66, Institute of Electrical and Electronics Engineers.

* cited by examiner

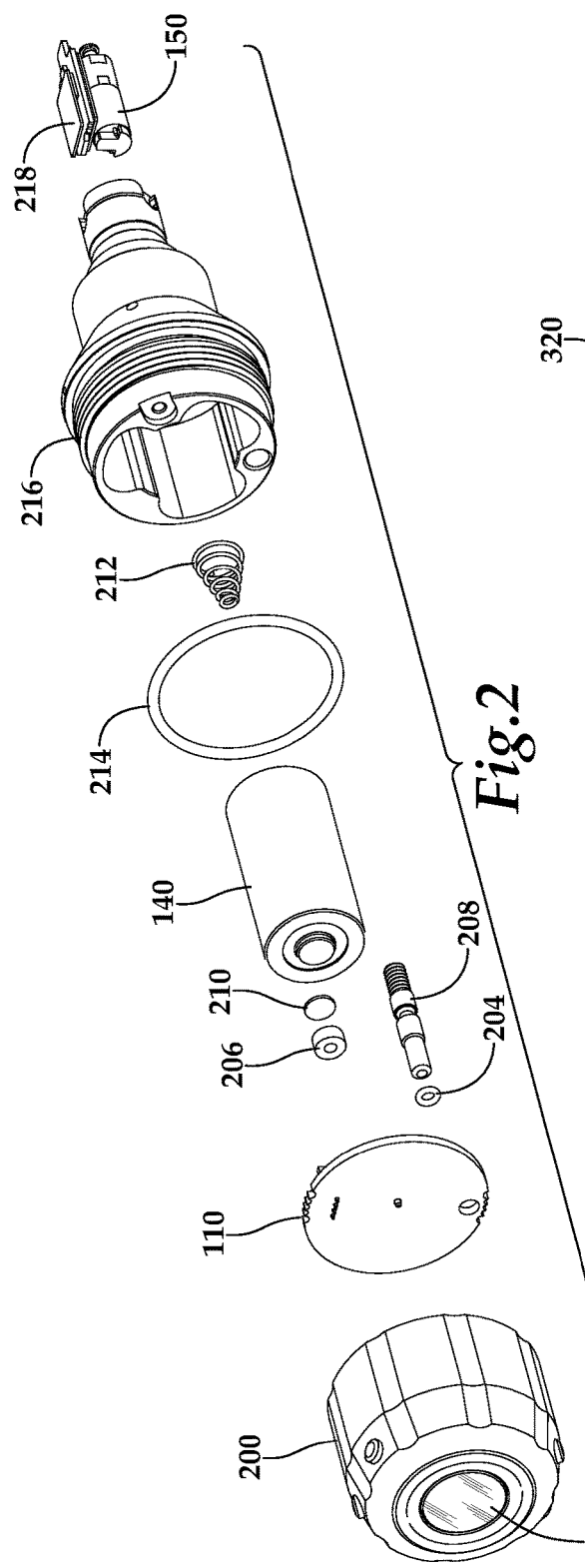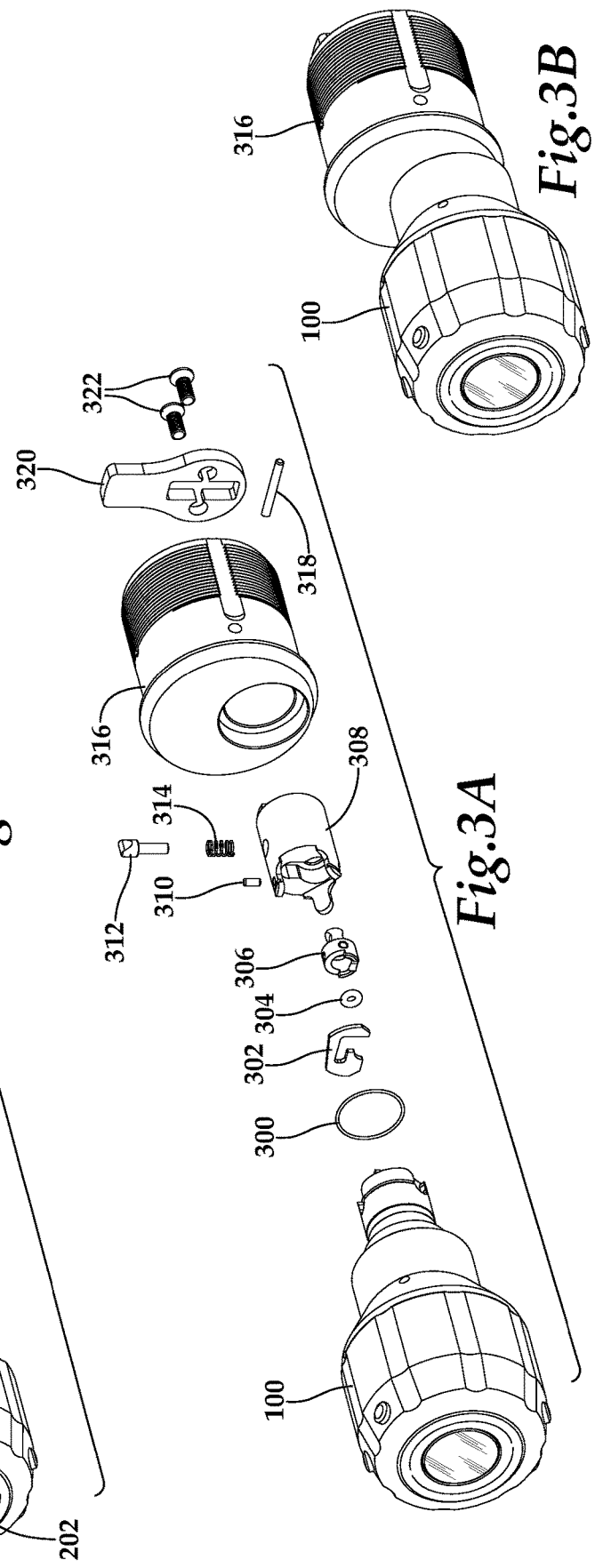

ELECTRONIC ACCESS CONTROL BASED ON OPTICAL CODES

RELATED APPLICATIONS

This application is a continuation of U.S. patent application Ser. No. 15/809,917, entitled "VISIBLE LIGHT COMMUNICATION OF AN ACCESS CREDENTIAL IN AN ACCESS CONTROL SYSTEM" and filed on Nov. 10, 2017, now allowed, which is a divisional of U.S. patent application Ser. No. 15/289,116, entitled "VISIBLE LIGHT COMMUNICATION OF AN ACCESS CREDENTIAL IN AN ACCESS CONTROL SYSTEM" and filed on Oct. 7, 2016, now U.S. Pat. No. 9,847,020 issued on Dec. 19, 2017, which claims the benefit of U.S. Provisional Patent Application No. 62/239,884, entitled "APPARATUS AND METHOD FOR MULTI-CHANNEL COMMUNICATION IN AN ACCESS CONTROL SYSTEM" and filed on Oct. 10, 2015. Each of the above-identified applications is incorporated herein by reference in its entirety.

TECHNICAL FIELD

This disclosure relates generally to the field of electronic access control, and more particularly to the use of optical codes to authenticate access in an access control system.

BACKGROUND INFORMATION

Electronic access control systems typically provide the means to exchange access control information between electronic devices. By way of example, an electronic key or other electronic access control device may transmit, via wired or wireless communication technologies, authentication information such as an access code to an electronic lock in order to initiate an unlocking event.

In many access control systems, existing communication techniques suffer from disadvantages that may make the exchange of desired information impractical. For instance, if the time period required to transmit or exchange access control information is perceptible to users, it can substantially reduce the utility of the system. In a facility where instantaneous access to an area or item is desired, time delays associated with electronic communications or configuration of devices for communication may be intolerable. Moreover, it has become commonplace in the broad field of electronic access control to energize devices with replaceable or rechargeable power sources, such as batteries. Frequent exchange of information between devices can quickly drain the capacity of depletable power sources, rendering the system inoperative.

BRIEF DESCRIPTION OF THE DRAWINGS

For a more complete understanding of this disclosure, non-limiting and non-exhaustive embodiments and implementations of the disclosure are described, including various embodiments and implementations with reference to the accompanying drawings, in which:

FIG. 2 is an exploded perspective view illustrating an example electronic locking device, wherein elements of the electronic locking device are arranged in a knob-like housing.

FIG. 3A is a partly exploded perspective view illustrating the example electronic locking device of FIG. 2 as assembled and further illustrating an example mortise shell, wherein the example mortise shell is shown exploded.

FIG. 3B is a perspective view illustrating the example electronic locking device of FIG. 2 coupled to the example mortise shell of FIG. 3A.

DETAILED DESCRIPTION

Figure 1:
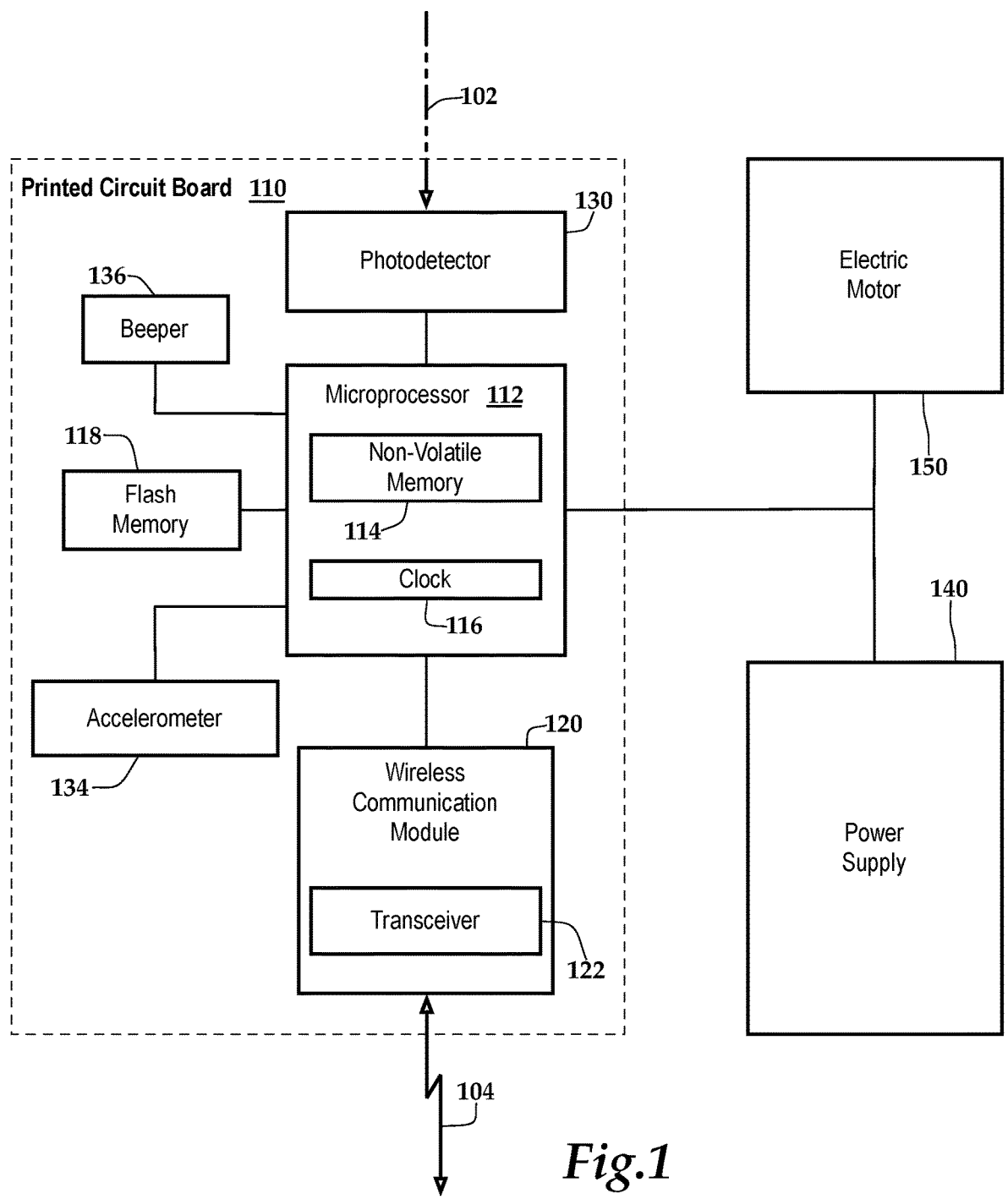
FIG. 1 is a block diagram illustrating an example electronic locking device.

In view of the difficulties associated with transmitting diverse categories of access control information between electronic devices of an access control system, the present inventor recognized there is a need for providing a plurality of communication channels such that access control information of varying types may be transmitted via distinct communication interfaces according to its type or intended use. Namely, the present inventor recognized that there is a need to transmit certain types of access control information, such as authentication information, via a unidirectional communication channel that does not require time consuming configuration, while other types of access control information, such as audit trail information, may be transmitted via bidirectional communication channels that can be unreliable or require timely configuration of the devices prior to transmission.

To illustrate, the design of an access control system may demand that access control information of a certain type, or category, is transmitted with more urgency than other categories of access control information employed by the system. In some systems, certain categories of access control information must be exchanged quickly and reliably for the system to provide basic functionality to users. Meanwhile, other categories of access control information may be peripheral, or the system may be designed such that immediate exchange of such information is not necessary for effective operation. For example, the desired mobility of personnel in an access control system may dictate instantaneous, or near instantaneous, exchange of access control information associated with access authentication, such as a password or ID number. An electronic locking device capable of selectively restricting access to an area or enclosure can exchange authentication information with an electronic access device, such as an electronic key operated by a user of the system, in order to grant or deny the user access to the area or enclosure. Delays or interruptions in the exchange of authentication information between lock and key may impede the user's movement. In facilities where it is desired or necessary to have users pass quickly between restricted areas, or between unrestricted and restricted areas, delays in the exchange of authentication information can render an access control system unusable.

Access control information of other types may be used by the system, or by users of the system, in a manner that renders instantaneous exchange superfluous. For instance, while exchange of access control information associated with user movement patterns may provide utility to administrators of a system, instantaneous exchange of such information may not necessarily provide added benefit when compared to slower methods of transmission, or delayed transmission. In some instances, administrators may use or analyze this information at the end of the day, or at the close of a week. In other facilities, such information may be used in the event of an emergency, or other rare or unusual event. In these few examples, instantaneous exchange of user movement pattern information is unnecessary and could even impose delays on the exchange of more time-sensitive information, such as authentication information. Further, exchange of certain voluminous categories of access control information, such as information associated with previous access events (e.g. information relating to all successful openings of a certain locking device during the previous month), may demand significant time and electrical power. In some access control systems, transmission of voluminous categories of access control information may even be discouraged. For instance, in systems with high-traffic access points, delays associated with exchange of voluminous information can decrease the overall utility of the system.

In access control systems designed to track and record the movement or usage of numerous devices and/or users, a high-bandwidth, bidirectional wireless communication interface (e.g. Wi-Fi) can be used to facilitate the exchange of sizeable volumes of information between devices. However, many high-bandwidth communication protocols require a communicating device to first provide access credentials (e.g. Wi-Fi network password), resulting in additional time to configure the device for communications. The need to configure a device, for example by providing network and password information, to enable communications over certain communication protocols is not conducive to systems designed to serve transient or one-time users. Further, many high-bandwidth communication protocols, such as Wi-Fi, require dedicated or specialized hardware to provide the communication network infrastructure. This may not be practical in sprawling or remote facilities.

With other bidirectional wireless communication protocols, for example those that facilitate direct device-to-device communication, establishing a link between devices (i.e. "pairing") may require considerable time and/or be prone to failure or interruption. For example, in some systems utilizing Bluetooth communication protocols, establishing a communication link between devices can take up to 10 seconds, or more. Depending on the desired operational thresholds of the system, this delay can be impractical. For instance, in various access control systems it is desired to provide users with near-instantaneous access to an entryway secured by an electronic locking device. In yet other systems, a delay in the opening procedure can cause unacceptable frustration in users of the system, such as where an access control device is installed on a home residence or hotel door. Many bidirectional communication protocols, such as Bluetooth, typically necessitate a dedicated software application to be installed on the communicating device to manage the selection and exchange of desired information. Finding and launching dedicated software applications, for example on a commercially available smartphone or tablet computer, may further increase the time required to establish a communication link and exchange information. Present bidirectional wireless communication protocols require the devices to include dedicated communication circuitry. Further, commercially available devices, such as smartphones, require the user to invest additional time to configure the device to enable the desired bidirectional communication, for example by entering network information or by configuring a software application executing on the smartphone. The present inventor recognized that dedicated communication circuitry and time delays associated with configuration of present bidirectional wireless communication protocols are not conducive to exchanging authentication information; namely, in access control systems that accommodate transient or one-time users who may wish to utilize devices without the appropriate communication circuitry or who do not desire to invest time reconfiguring their device for a one-time use.

The power consumption of high-bandwidth, bidirectional (i.e. half-duplex or full-duplex) communication interfaces can be prohibitive, particularly in access control systems employing electronic devices powered by batteries (or similar depletable power sources). In such systems, exchanging authentication information (e.g. each time a user wishes to gain access to an area or item) via high-bandwidth communication protocols, such as Wi-Fi, will quickly exhaust the power supply of an electronic locking device, rendering the system inoperative. Indeed, in systems with depletable power sources, low-bandwidth communication interfaces (e.g. infrared, ZigBee, etc.) can often be employed to conserve the limited supply of power. However, in systems utilizing low-bandwidth communication interfaces, the exchange of certain categories of access control information is often restricted by slow data transfer rates, thereby eliminating a system administrator's ability to monitor all elements of the system. With existing methods and technologies for transmitting or exchanging access control information in an access control system, administrators must make a choice between using high-bandwidth communication interfaces that necessitate an ample supply of electrical power and may entail configuration challenges and protracted or unreliable communication between devices, or using low-bandwidth communication interfaces with sluggish data transfer rates that can hinder administrative monitoring and system functionality.

The present inventor recognized that responsiveness and power consumption of access control systems are both improved by distributing the transmission of access control information across multiple, distinct communication channels depending, in part, on the characteristics of the access control information to be transmitted. In some instances, access control information can be transmitted via unidirectional (i.e. simplex) communication channels. For instance, the present inventor recognized that transmitting certain access control information via unidirectional communication channels can result in a more flexible, responsive, and reliable access control system, namely in access control systems that accommodate transient or one-time users.

Turning now to FIG. 1, an electronic locking device 100 comprises a printed circuit board (PCB) 110, a power supply 140, and an electric motor 150. The arrangement of electronic locking device 100 as shown in FIG. 1 is illustrative in nature and skilled persons will appreciate that a variety of mechanical and electronic arrangements for electronic locking devices are known in the field of electronic access control. Electronic locking device 100 can be arranged in any suitable manner that renders it capable of restricting access to an area, enclosure, or item, or portion thereof. Generally speaking, electronic locking devices known to skilled persons typically comprise electronic circuitry for receiving an input signal, a blocking member (or other mechanical means for restricting movement or operation of the locking device), and a motor, solenoid, or similar electrical device for actuating movement of the blocking member upon receipt of an authorized input signal. These elements are described to illustrate known implementations of electronic locking devices and are in no way intended to limit the scope of this disclosure and the various embodiments and implementations of electronic locking device 100 described herein.

Electric motor 150 in FIG. 1 can be operatively coupled to any appropriate blocking member (not shown in FIG. 1). The form and arrangement of the blocking member may vary to suit the area or item that electronic locking device 100 is designed or intended to secure. Electric motor 150 can be operatively coupled to a blocking member (or any structural component capable of restricting access to the area, enclosure, or item) in any appropriate manner that enables the rotational force generated by electric motor 150 to cause displacement of the blocking member from its default locking position; thereby allowing a user to operate electronic locking device 100, or to otherwise access the area, enclosure, or item secured by the device. Although electric motor 150 is illustrated in this disclosure as being arranged within the same device or enclosure as the other components of electronic locking device 100, skilled persons will appreciate that electric motor 150 can, in accordance with various implementations, be arranged independently from the other components of electronic locking device 100, for example on the other side of a door or enclosure. Although various embodiments and implementations described in this disclosure make reference to a motor device (i.e. electric motor 150), skilled persons will understand that a motor is but one example of a device capable of actuating a blocking member and that other known devices and methods may have utility in certain embodiments. For instance, a solenoid device can be used to convert electrical power into a mechanical force to actuate a blocking member. In other implementations, an electric switch can be utilized to restrict access to an area or an item. For example, actuation of the switch may cause delivery of electrical power to a magnetic locking device, or to a lighting device to illuminate an area that, without a light source, would be unusable or inaccessible. It will be understood that the embodiments and implementations described in this disclosure may have utility in a variety of applications, namely those applications utilizing an authentication process to grant or restrict access to an area or item, such as athletic clubs, rental cars, sporting events, parking garages, and vending machines, to identify just a few examples.

Referring still to FIG. 1, PCB 110 has embedded thereon, a microprocessor 112 that is operatively associated with a plurality of components using wired links, wireless links, or a combination thereof. Skilled persons will appreciate that the term "microprocessor" is used for convenience and that microprocessor 112 may be implemented as any appropriate electrical circuitry. Various embodiments described in this disclosure may be implemented using electrical circuitry. The term "electrical circuitry" includes hardware elements, software elements, and/or a combination of both hardware elements and software elements. Examples of hardware elements may include processors, microprocessors, circuits, circuit elements (e.g. transistors, resistors, capacitors, inductors, and the like), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In some embodiments, hardware elements may execute software elements to provide at least some of the described functionality.

Microprocessor 112, as illustrated by FIG. 1, can be operatively linked to a wireless communication module 120 and a photodetector 130. Additionally, FIG. 1 shows PCB 110 as having embedded thereon, and operatively linked to microprocessor 112, an accelerometer 134, and a beeper 136. Other components may be embedded on PCB 110 as desired, depending on the characteristics of the particular access control system. For instance, PCB 110 can also include a light-emitting diode (LED) or similar device capable of delivering visual signals to a user of the device. Microprocessor 112 can include additional non-volatile memory 114 and a clock 116 embedded thereon. Electronic locking device 100 can include additional electronic memory sites if desired and indeed, an example arrangement of PCB 110 is depicted in FIG. 1 as comprising a separate flash memory 118 operatively associated with microprocessor 112.

Wireless communication module 120 is shown in FIG. 1 as comprising an embedded transceiver 122, but it will be understood that a transceiver or antenna can be provided in non-embedded configurations and operatively linked thereto. It will further be understood that electronic locking device 100 may comprise a plurality of wireless communication modules, for example to facilitate wireless communication across multiple protocols. Wireless communication module 120 may utilize various known methods and protocols of wireless communication including infrared, IEEE 802.11x, WI-FI DIRECT®, BLUETOOTH®, ZIGBEE®, NFC, and/or other wireless communication methods and protocols known to skilled persons. Appropriate wireless communication modules can be obtained commercially and include that sold under the model number "MRF24WB0MA" by Microchip Technology of Chandler, Ariz. It will be appreciated by skilled persons that other suitable wireless communication circuitry may have utility in electronic locking device 100.

Photodetector 130 can be any optoelectronic device capable of receiving and converting light signals into electrical current, including photodetectors, photodiodes, phototransistors, etc. Use of the term "photodetector" is not intended to restrict any embodiments of this disclosure to a particular type or category of optoelectronic device. For example, photodetector 130 may be an imager, such as an active pixel-sensor (APS) imager incorporating a plurality of charge-coupled device (CCD) image sensors or complementary metal-oxide-semiconductor (CMOS) image sensors. In other applications, photodetector 130 may simply be implemented as a light sensitive cell that measures illuminance (lux) or irradiance values. Appropriate photodetectors are commercially available and include the phototransistor photodetector sold under the model number "KDT00030" by Fairchild Semiconductor of San Jose, Calif. The KDT00030 phototransistor photodetector, for example, has a maximum relative sensitivity to optical signals at wavelengths of 630 nm (i.e. in the visible light range). However, it will be understood that other photodetectors with varying peak sensitivities may have utility, for example photodetectors with peak sensitivities to wavelengths above 800 nm can be used to receive infrared optical signals. Skilled persons will appreciate that other photodetectors not expressly described herein may have utility in electronic locking device 100. For example, in applications where photodetector 130 may be exposed to significant noise, an optoelectronic device comprising both a photodetector and an amplifier can be employed to reduce noise interference.

In addition to non-volatile memory 114 embedded on microprocessor 112, flash memory 118 of PCB 110 can be commercially available flash memory and, according to at least some embodiments, is configured to store access control information, for example an audit trail (i.e. log of previous access events, such as details associated with an opening of electronic locking device 100), access credential (e.g. access codes or other authentication information, etc.), and other access control information used in the various embodiments and implementations of this disclosure. Skilled persons will appreciate that, for purposes of this disclosure, the term "access control information" refers to any information stored, transmitted, or utilized by electronic locking device 100, or by other electronic devices deployed in the access control system. While electronic locking device 100 is described and illustrated herein as containing a plurality of separate memory units (non-volatile memory 114, embedded on microprocessor 112, and flash memory 118), it will be understood that electronic locking device 100 may utilize any appropriate arrangement of electronic memory sites to store information, including a single non-volatile memory unit operatively linked to microprocessor 112.

Accelerometer 134 can be any device capable of measuring acceleration forces and may for example comprise a multi-axis accelerometer or, alternatively, acceleration forces can be measured by a combination of multiple, single-axis accelerometers. Beeper 136 can be any audio signaling device such as a piezoelectric buzzer or other audio signaling devices known to skilled persons. Although FIG. 1 depicts the various components as embedded on PCB 110 and linked to microprocessor 112, skilled persons will appreciate that in at least some implementations, these components can be arranged separately from PCB 110 and operatively associated with microprocessor 112 utilizing known methods such as wired or wireless links, or a combination thereof.

Referring still to FIG. 1, it will be understood that wireless communication module 120 is configured in a manner that renders it capable of establishing a bidirectional wireless communication (BWC) interface 104 with a remote electronic device. BWC interface 104 can be implemented using known wireless communication methods and protocols, and depending on the particular communication circuitry employed by wireless communication module 120, may include Infrared Data Association (IrDA), 802.11x, Wi-Fi Direct, Bluetooth, Zigbee, NFC, Z-WAVE®, DECT, RUBEE® and/or other wireless communication protocols known to skilled persons.

Photodetector 130 is arranged, in relation to the other elements of electronic locking device 100, in a manner that renders it capable of receiving a wireless optical signal 102 from a remote source. Wireless optical signal 102 can be implemented using any optical communication methods and technologies known to skilled persons including visible light communication (VLC), infrared communication (IRC), and/or ultraviolet communication (UVC). It will be appreciated that these terms refer to the wavelength of the optical signal and that, for example, implementation of wireless optical signal 102 using VLC methods does not necessarily mean that a human eye will be able to decipher the information carried by the signal.

Turning now to FIG. 2, in accordance with various embodiments, electronic locking device 100 comprises a knob-like housing configured to secure or enclose at least some elements of electronic locking device 100. The housing, or at least one element of electronic locking device 100, can be operatively coupled to a modified lock cylinder or other retaining mechanism (not shown in FIG. 2). FIG. 2 shows an exploded isometric view of the knob-like housing. In addition to PCB 110, power supply 140, and electric motor 150, various implementations of electronic locking device 100 further comprise a retaining cap 200 and a knob body 216, thereby forming the knob-like housing. In accordance with some implementations, electronic locking device 100 further comprises a window 202, that may be retained against the circular opening in the anterior face of retaining cap 200. Window 202 is constructed of any material that allows passage, through the window, of optical signals such that information carried by wireless optical signal 102 can be delivered to photodetector 130. Here, retaining cap 200 may comprise sidewalls arranged such that window 202 is recessed slightly in relation to the anterior face of retaining cap 200. This arrangement (and similar arrangements) of window 202 in relation to retaining cap 200 may suppress ambient light from reaching photodetector 130 and causing interference with wireless optical signal 102 (as will be described further below with respect to FIG. 5).

As illustrated in FIG. 2, electronic locking device 100 further comprises a beeper pad 206 and a beeper vent 210 that, together with beeper 136 (embedded on PCB 110 and not shown in FIG. 2), are configured to generate audible signals. Electronic locking device 100 may comprise additional elements such as a small O-ring 204, a lock screw 208, a spring 212, and a large O-ring 214, that are configured, in accordance with various implementations, to couple retaining cap 200 to knob body 216 and thereby secure the desired elements of the locking device inside the knob-like housing. As depicted in FIG. 2, electronic locking device 100 can, in some implementations, include a second printed circuit board, locking PCB 218, located remotely from PCB 110. In such implementations, locking PCB 218 can be configured to control operation of electric motor 150. Here, locking PCB 218, like PCB 110, comprises electrical circuitry (e.g. a microprocessor). In accordance with various embodiments, locking PCB 218 is configured to cause delivery of electrical power to electric motor 150 upon receiving, via wired or wireless links, a signal from microprocessor 112 (embedded on PCB 110 and not shown in FIG. 2) comprising instructions to lock or unlock the entry point. In this manner, criminal tampering or other unauthorized forces that result in a compromise of PCB 110 may not also result in a wrongdoer gaining access to or otherwise being able to manipulate electric motor 150, thereby reducing the risk of unauthorized access to the item or area secured by electronic locking device 100. The elements shown in FIG. 2 illustrate but one possible implementation of electronic locking device 100, arranged specifically for cooperation with a mortise cylinder. Skilled persons will appreciate that alternative arrangements, mechanical configurations, designs, and structural elements may have utility in other implementations of electronic locking device 100. For example, electronic locking device 100 can be configured for cooperation with, or as a replacement for, other locking hardware such as a padlock, cam lock, t-handle vending lock, or safe lock, just to name a few possible implementations.

Acknowledging that the configuration of electronic locking device 100 may vary depending, at least in part, on the specifications of the area or item to be secured, FIGS. 3A and 3B illustrate but one example of electronic locking device 100 configured for cooperation with a mortise cylinder. In this implementation, electronic locking device 100 comprises a knob-like housing (such as that illustrated in FIG. 2). FIG. 3A shows electronic locking device 100 operatively coupled to a mortise shell 316 by way of stop plate 302, locking element 306, lock core 308, lock pin 312, and spring 314. Additionally, a snap ring 300, an O-ring 304, an antenna 310, a dowel pin 318, a cam 320, and screws 322 can be utilized, at least in part, to couple electronic locking device 100 to mortise shell 316. Although electronic locking device 100 is described and illustrated in this disclosure as being mechanically coupled to a lock cylinder (here, a mortise cylinder), in various implementations electronic locking device 100 and a lock cylinder or other lock hardware can be configured as a single locking device, such as a padlock. In another example, electric motor 150 can be configured remotely from the other elements of electronic locking device 100 and operatively coupled to a door or locking hardware, such as a deadbolt or other blocking member designed to restrict access to an entry point. In yet another example, electric motor 150 can be an element of an access control system designed to restrict access to a large area (e.g. a turnstile at an arena or a barrier gate at a parking garage) or a small enclosure (e.g. an electronic locking system in an automobile or a gun safe). Here, the other elements of electronic locking device 100, namely photodetector 130 and microprocessor 112, can be configured to interface with or otherwise communicate unlocking or locking commands to an input device for the access control system, such as a microprocessor or door controller device that is designed to cause delivery of electrical power to electric motor 150.

Persons of skill will appreciate that electronic locking device 100, in conjunction with cooperative lock hardware, can be configured to simulate the mechanical operation of known, commercially available locking cylinders. Accordingly, mechanical and electronic operation of the example electronic locking device illustrated by FIG. 3A and FIG. 3B will only be described briefly as the operation of electronic lock cylinders is well understood by skilled persons. For instance, in a default, locked position, spring 314 urges lock pin 312 away from lock core 308 such that the distal end of lock pin 312 (i.e. the end of the lock pin extending outward from lock core 308) is positioned inside a cavity or recess (not shown) of mortise shell 316, or otherwise contacts mortise shell 316 such that lock pin 312 can resist rotational movement of lock core 308 within mortise shell 316. In this example, locking element 306 is arranged at least partially inside of lock core 308 in a manner resisting movement, perpendicular to the longitudinal axis, of lock pin 312 (through the opening of lock core 308).

Here, electronic locking device 100 is configured to selectively enable rotational movement of lock core 308 within mortise shell 316 by causing rotation of locking element 306 such that the proximal end of lock pin 312 (i.e. the end of the lock pin positioned at least partially inside lock core 308) is urged, by a rotational force acting on lock core 308, into the circular opening of the posterior end of locking element 306. For example, when a user presents valid authentication information to electronic locking device 100, thereby initiating an unlocking sequence, microprocessor 112 (not shown in FIG. 3A) causes delivery of electrical power to electric motor 150 (not shown in FIG. 3A) such that electric motor 150 causes rotational movement of locking element 306. In this manner, locking element 306 is rotated to an open position, wherein the circular opening of locking element 306 is aligned with the circular opening of lock core 308. Thereafter, the user can manually apply force to rotate electronic locking device 100 via the knob-like housing (i.e. rotate the housing by hand). Here, manual rotation of the housing applies a rotational force to lock core 308 which thereby urges lock pin 312 into the now aligned circular opening of locking element 306. With lock pin 312 capable of displacement into the opening of locking element 306 and no longer resisting rotational movement of lock core 308, the locking device is in a mechanically openable state and the rotational force applied by the user causes rotation of lock core 308 which, in turn, rotates cam 320 to thereby actuate a latch or locking bolt (not shown in FIG. 3A) to unlock the entry point. Skilled persons will appreciate that FIGS. 3A and 3B illustrate but one implementation of electronic locking device 100 in cooperation with a lock cylinder and that other arrangements may be appropriate depending on the item or device to be secured. For instance, in certain implementations, electronic locking device 100 comprises a single blocking member that, by itself, secures the entry point, for example by restricting movement of a door or enclosure. In such implementations, delivery of power to electric motor 150 causes actuation of the single blocking member such that the door or enclosure (i.e. entry point) can be opened without any further manipulation to the locking device.

Electronic locking device 100 may, in accordance with various embodiments, have utility in a diverse range of applications. Accordingly, electronic locking device 100 can be arranged in a variety of ways to secure different entry points. For convenience, the term "entry point" as used throughout this disclosure shall refer to any gateway facilitating access to an area, enclosure or item. An entry point may have, or may cooperate with, a blocking element restricting access to the area, enclosure or item (e.g. a blocking member such as a deadbolt). The blocking element may be actuated to a state permitting access to the area, enclosure, or item, or portion thereof. While an entry point may, in an unlocked state, permit a user to physically access an area, enclosure, or item, such as a door or gate, it may also include access that is not necessarily physical in nature. For example, an entry point can comprise a window that, when unlocked, permits a user to view what is on the other side, but does not otherwise allow ingress and egress. To illustrate, entry points include doors, turnstiles, safes, gates, lockers, windows, cabinets, enclosures, parking garages, and vehicles, to identify just a few examples. Other specific examples of entry points are identified in the various embodiments described in this disclosure. As electronic locking device 100 can be arranged to interact with a variety of blocking members and other hardware depending on the design of the entry point to be secured, it will be understood by skilled persons that the phrase "unlock the entry point" refers to any event in which electronic locking device 100 (or a portion thereof) is actuated to permit access to an area, enclosure, or item. Descriptions of various embodiments that include a reference to unlocking or opening of electronic locking device 100 are synonymous with unlocking the entry point, unless context context dictates otherwise. To illustrate, in some implementations electronic locking device 100 can be actuated to displace a deadbolt to unlock an entry point such as a door. In other implementations, electronic locking device 100 can be actuated to displace a lift gate to unlock an entry point such as a parking garage.

Figure 4:
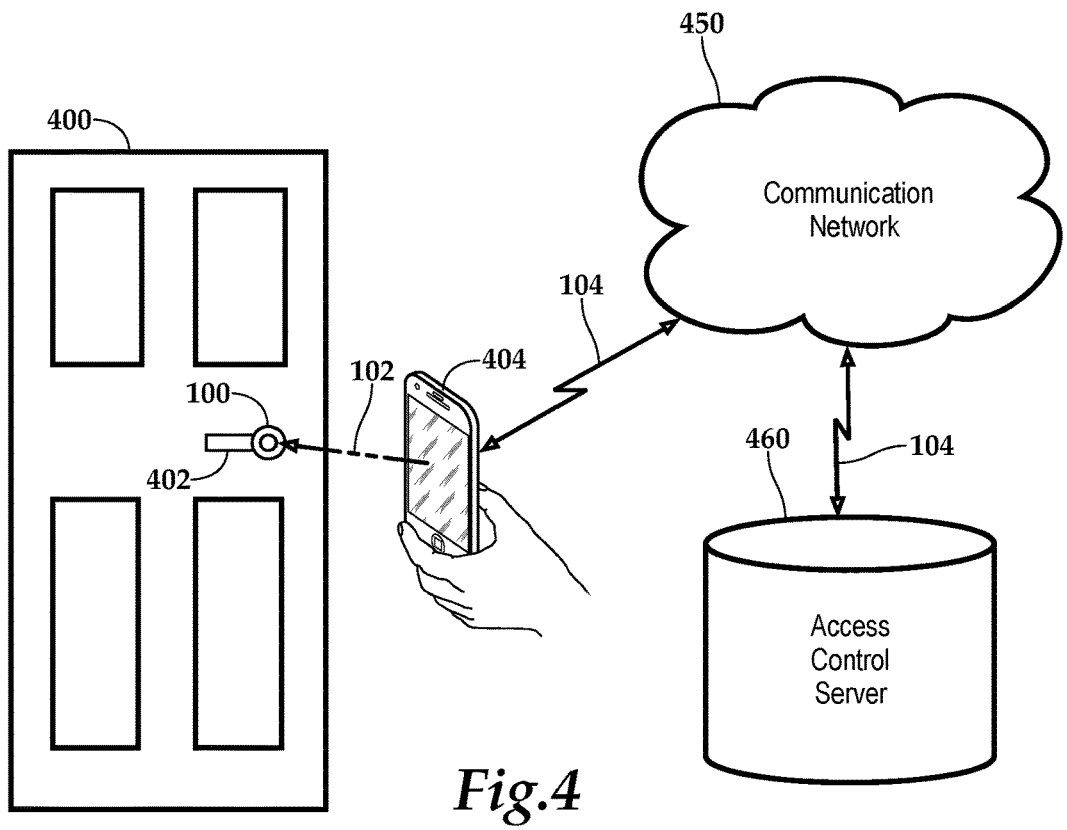
FIG. 4 is a block diagram illustrating example communications between an optical signal generator and an electronic locking device and example communications between the optical signal generator and an access control server.

In accordance with various embodiments, electronic locking device 100 is configured to receive authentication information from an electronic device via wireless optical signals. Referring now to FIG. 4, electronic locking device 100 is configured to restrict movement of and selectively control access to door 400. As illustrated in FIG. 4, in this example electronic locking device 100 is coupled to and restricts rotational movement of door handle 402. A user wishing to operate electronic locking device 100 (e.g. for the purpose of opening door 400) positions optical signal generator 404 such that wireless optical signal 102 can be received by photodetector 130 (not shown in FIG. 4) of electronic locking device 100. Optical signal generator 404 can be any electronic device capable of generating optical signals that can be received and converted by photodetector 130, including, for example, a smart device such as commercially available smartphones and tablets. As used in this disclosure, the term "smart device" refers to a network device that is generally connected to other devices or networks and can operate to some extent interactively and autonomously. Examples of smart devices include smartphones (e.g. Apple iPhone, Android phones, etc.), tablets and phablets (e.g. Apple iPad, Amazon Kindle, Google Nexus, Samsung Note etc.), smart watches (e.g. Apple Watch, Samsung Gear, etc.), personal desktop computers, laptop computers, to identify a few specific electronic devices.

In some implementations, optical signal generator 404 transmits authentication information, such as an access credential or access code, to electronic locking device 100 via wireless optical signal 102. As used throughout this disclosure, the term "authentication information" refers to any information utilized by a component of an access control system (e.g. electronic locking device 100) to authenticate a user or device, for example if authentication is desired prior to initiating access, operation, or communication. Authentication information can include information such as access codes or other credentials (e.g. binary string), authorized time and date schedules (i.e. permissions to access certain electronic locking devices at certain times), user names, passwords, and ID numbers, to identify just a few specific examples. Authentication information is generally described in this disclosure as comprising access codes, however skilled persons will appreciate that this is illustrative in nature and does not limit authentication information to any particular content or arrangement. For clarity, authentication information is a subset of access control information specifically related to the authentication of a user or device.

As described above, wireless optical signal 102 can be implemented using any known optical communication methods. For example, optical signal generator 404 can transmit authentication information to electronic locking device 100 via visible light communication (VLC) methods and technologies. In at least some embodiments, optical signal generator 404 is operatively associated with one or more light-emitting diodes (LEDs). The LED can be configured to generate visible light pulses at a frequency or pulse pattern capable of transmitting information, in the form of VLC signals, to electronic locking device 100. It will be understood that the term visible light does not necessarily mean that the pulses or other modulations of the optical communication will be visible to the human eye. Rather, visible light communication is used to refer to the wavelength of light used to facilitate transmission of information, with light in the visible spectrum generally falling, depending on the visual acuity of the viewer, anywhere between approximately 375 and 780 nanometers (nm). In other embodiments, optical signal generator 404 comprises an infrared (IR) transmitting device to facilitate transmission of information to electronic locking device 100 using IrDA or other IR protocols. It will be appreciated by skilled persons that VLC and IrDA are examples of appropriate optical communication protocols and that other optical signals may be used to implement wireless optical signal 102.

Figure 5:
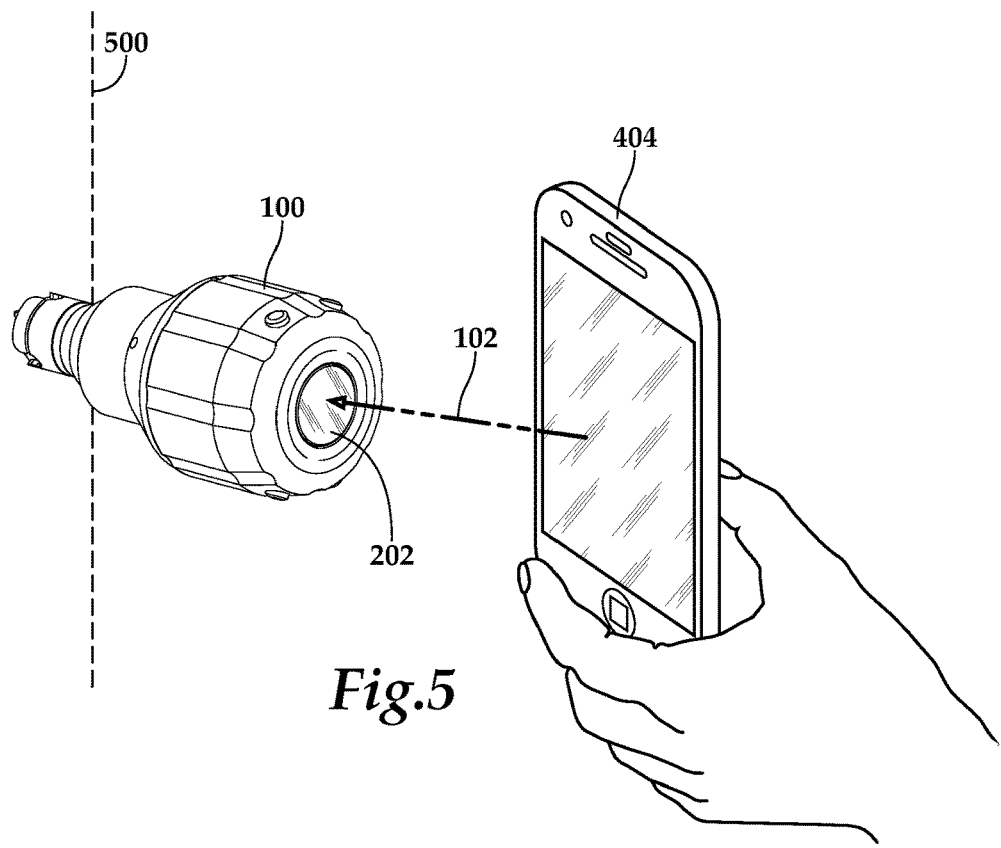
FIG. 5 is a perspective view illustrating a user positioning an optical signal generator comprising a display screen to facilitate delivery of an optical signal presented on the screen to an electronic locking device.

FIG. 5 illustrates a user positioning optical signal generator 404 such that wireless optical signal 102 can be delivered to photodetector 130 (not shown in FIG. 5) in accordance with various embodiments of this disclosure. A specific entry point is not illustrated in FIG. 5; rather, skilled persons will appreciate that installation boundary 500 represents any appropriate entry point arranged to cooperate with this particular implementation of electronic locking device 100. If optical signal generator 404 comprises a display screen such as that commonly found on commercially available smartphones or tablets, optical signals can be generated via a light source associated with the display screen. The display screen can be any user interface display capable of producing visual content to the user, including an LED display, an organic light-emitting diode (OLED) display, a liquid crystal display (LCD), and touchscreen embodiments thereof, just to identify a few examples. Here, a user positions optical signal generator 404 such that light signals generated by its display screen are directed towards the anterior face (i.e. the face extending outward from the door or enclosure) of electronic locking device 100. To illustrate, in this orientation of optical signal generator 404, the display screen (or other optical transmitting device such as an LED) is directing VLC signals towards window 202 of electronic locking device 100. In this example, electronic locking device 100 is configured in a manner allowing wireless optical signal 102 to pass through window 202 and be received by photodetector 130 (not shown). In various embodiments, the user may actually place at least a portion of the display screen (or other surface portion of optical signal generator 404) in contact with the anterior face of electronic locking device 100. Here, the sidewalls of retaining cap 200 (discussed above with respect to FIG. 2) may, in conjunction with the surface of the display screen, block ambient light that could otherwise interfere with accurate reception of wireless optical signal 102 at photodetector 130. Skilled persons will appreciate that the exact position of optical signal generator 404 in relation to electronic locking device 100 may vary depending on the configuration of the locking device and the communication protocols utilized in the implementation of wireless optical signal 102.

Turning now to FIGS. 1 & 4, electronic locking device 100 can be configured to compare (e.g. utilizing electrical circuitry such as microprocessor 112) authentication information transmitted by optical signal generator 404 with authentication information or other access control information stored in memory sites of electronic locking device 100 (e.g. in non-volatile memory 114 or flash memory 118). For example, where authentication information is transmitted to electronic locking device 100 via wireless optical signal 102, photodetector 130 may convert the received wireless optical signal 102 into a corresponding electrical signal representing the authentication information. Here, photodetector 130 (or cooperative electrical circuitry) may perform an analog-to-digital conversion, sampling the optical signal at defined intervals, to generate the corresponding electrical signal. It will be understood that photodetector 130 may convert or transform wireless optical signal 102 according to other known methods and techniques.

Skilled persons will appreciate that various methods and techniques exist for authenticating users in an access control system. For example, in accordance with at least some embodiments, writing a list of authorized access codes into flash memory 118 will enable electronic locking device 100 to accept authentication information from at least one electronic access device, such as optical signal generator 404. When electronic locking device 100 receives authentication information from optical signal generator 404, it is configured to compare the received authentication information (in this example, an access code) with the list of authorized access codes previously written to flash memory 118. If electronic locking device 100 determines that at least a portion of received authentication information matches at least a portion of the authentication information stored in flash memory 118, it can initialize an unlocking sequence to unlock an entry point, for example by causing delivery of power to electric motor 150 to actuate a blocking member restricting access to the entry point. It will be understood that a comparison of received authentication information with information stored in memory is but one example of authenticating the user or device and that electronic locking device 100 can perform other operations to determine whether the received authentication information corresponds to access control information stored in memory, or whether the authentication information otherwise authorizes the user of the transmitting device to access the entry point. If electronic locking device 100 determines that the received authentication information does not authorize the user to access the entry point, it can alert the user that access to the device is denied, for example by generating an audible tone via beeper 136, or by generating other visual or audible signals. In some implementations, electronic locking device 100, upon receipt of invalid or expired authentication information, transmits a signal to a remote device to indicate an unauthorized access attempt, such as optical signal generator 404, an alarm, or a server device.

Electronic locking device 100 can be configured to search through the entire list of authorized codes in flash memory 118 for comparison with received authentication information. In other implementations, electronic locking device 100 can use a pointer to select a single code, or a subset of the access codes in flash memory 118, for comparison with received authentication information. To demonstrate one example, if electronic locking device 100 is indeed configured to utilize a pointer, a set of access codes is written to flash memory 118. In such implementations, optical signal generator 404 or other suitable electronic device capable of communicating access control information to optical signal generator 404 can maintain, in memory sites, a copy of the same set of access codes that were written to flash memory 118 of electronic locking device 100. Thereafter, each time an access code is transmitted to electronic locking device 100, the pointer is advanced (in both memory sites of electronic locking device 100 and optical signal generator 404) such that previously used access codes are not transmitted or otherwise not valid for use in future access events.

In accordance with some embodiments, multiple pointers can be utilized by electronic locking device 100 in order to maintain operability with a plurality of electronic access devices. In various implementations, two or more access devices are configured to transmit authentication information to electronic locking device 100. For example, if several optical signal generators are deployed in an access control system, it may be impractical to synchronize the pointer values in each optical signal generator 404, for example if the devices are not configured to frequently exchange access control information with one another or with a management device, such as a system server. Accordingly, electronic locking device 100 can maintain a separate pointer value for each optical signal generator 404 deployed in the system. In this example, two or more optical signal generators each have, in memory sites thereof, a copy of an access code set (or other authentication information). Here, each optical signal generator 404 can be associated with a unique pointer value whereby each signal generator will, according to its pointer value, transmit authentication information from a different location in the shared set of access codes. Authentication information transmitted to electronic locking device 100 can comprise both a device identification value (e.g. serial number of optical signal generator 404) and an access code. Electronic locking device 100, upon receipt of the authentication information, uses the pointer associated with the transmitting device to select an access code stored in memory for comparison with the access code received from the transmitting device. Thereafter, electronic locking device 100 advances the pointer associated with the transmitting device (in memory sites of the locking device), rendering the received authentication information invalid for use in future access events. Likewise, optical signal generator 404 can be configured to advance a pointer value maintained in memory sites of the optical signal generator. In this manner, electronic locking device 100 can maintain independent pointer values for each optical signal generator 404 deployed in the system, allowing a plurality of devices to utilize a single set of authentication information while reducing the need to synchronize such information across devices. Skilled persons will appreciate that storing pointer values associated with a set of information is but one example of maintaining authentication information and that other techniques and methodologies may have utility depending on the design of the system. For instance, electronic locking device 100 can be configured such that it stores, in memory sites thereof, a code or set of authentication information that is unique to each optical signal generator 404 deployed in the system.

Referring only to FIG. 4 now, in accordance with some embodiments, optical signal generator 404 can communicate with an access control server 460 located away from the signal generator to receive authentication information. For example, if optical signal generator 404 is configured as a smartphone or other similar electronic device with a wireless networking radio or other wireless communication circuitry, a user of optical signal generator 404 can use a web browser application (e.g. a conventional, commercially available mobile browser application) executing on the device to communicate with access control server 460. In this manner, a user seeking access to electronic locking device 100 can retrieve authentication information from a remote server, for example via BWC interface 104 and a communication network 450. Communication network 450 can be a wireless local area network (WLAN), for example if access control server 460 is configured to communicate across the same WLAN or alternatively, if communication network 450 and access control server 460 are both connected to the Internet. Skilled persons will appreciate that a WLAN refers to a wireless computer network that links two or more devices within a limited area, such as a building or school. A WLAN can be implemented using various wireless networking protocols, including IEEE 802.11 (Wi-Fi) and other similar communication protocols operating in a frequency range typically between 2.4 GHz and 5.9 GHz. Alternatively, communication network 450 can be a wireless wide area network (WWAN), such as a cellular network whereby optical signal generator 404 connects to the Internet and retrieves authentication information from access control server 460 using cellular communication technologies. Skilled persons will appreciate that a WWAN refers to a wireless network with broader coverage than a WLAN. A WWAN can be implemented using various wireless protocols including mobile telecommunication cellular network technologies such as long-term evolution (LTE), global system for mobile communications (GSM), code division multiple access (CDMA), and the like. A WWAN can also be implemented using wireless communication standards based on IEEE 802.16, such as worldwide interoperability for microwave access (WiMAX). Alternatively, a WWAN can be implemented by communicatively linking a plurality of short range communication nodes to create a mesh network. In yet other implementations, communication network 450 can be a low-power, wide-area network (LPWAN) whereby devices such as optical signal generator 404, electronic locking device 100, and access control server 460 may exchange information across long distances using lower bit rates, for example as interconnected devices using technologies and communication protocols commonly associated with the "Internet of Things." Other communication networks and protocols known to skilled persons may have utility in various implementations.

In accordance with at least some embodiments, access control server 460 can operate as a remote administration system to control, monitor, or provide information to other devices in the access control system. Access control server 460 can comprise memory sites including a database or list of access codes that is a copy of (or otherwise identical to) a database or list of access codes stored on electronic locking device 100. A user of optical signal generator 404 can use a web browser application executing on optical signal generator 404 to request, from access control server 460, authentication information for electronic locking device 100. Depending on the desired security of the access control system, access control server 460 can be configured to require the user of optical signal generator 404 to authenticate his or her identity prior to transmitting the requested access code, for example by entering in a user name and password or by utilizing other known methods to authenticate the user. In some implementations, optical signal generator 404 transmits biometric information associated with the user to access control server 460 in order to authenticate the user.

As described elsewhere in this disclosure, electronic locking device 100 can be configured to use a pointer when comparing received authentication information such that electronic locking device 100 compares received authentication information with a single access code, or subset of access codes, stored in flash memory 118. Access control server 460 can maintain information concerning the location of the pointer in electronic locking device 100 such that access control server 460 provides the code (or a limited number of codes) stored in memory at the location associated with the pointer. After electronic locking device 100 receives valid authentication information from optical signal generator 404 and initiates an unlocking sequence, it can be configured to advance the pointer in flash memory 118 such that authentication information used in previous access events will no longer be valid for use in future access events. Likewise, access control server 460 can also advance the pointer associated with that particular electronic locking device. In other implementations, electronic locking device 100 and access control server 460 can be configured to advance the pointer after a predetermined period of time has elapsed. In this manner, electronic locking device 100 and access control server 460 may minimize, or even eliminate, the risk associated with surreptitious interception of authentication information transmitted by optical signal generator 404 during an access event.

In yet other implementations, access control server 460 randomizes the pointer value for electronic locking device 100. To illustrate, electronic locking device 100 can be configured such that it does not maintain a pointer value associated with a set of stored access codes. Instead, electronic locking device 100 uses a pointer value transmitted by optical signal generator 404 during an access event. For instance, access control server 460 may maintain, in memory sites associated therewith, a set of access codes for use with electronic locking device 100. The quantity of access codes operable with a particular locking device may vary depending on the requirements and desired entropy of the system. In certain implementations, electronic locking device 100 can be configured with a set of access codes comprising one hundred values. In other implementations, electronic locking device 100 can be configured to accept access codes from a set comprising over one hundred thousand values. In yet other access control systems, each electronic locking device deployed in the system can be configured for use with a unique set of access codes that is not valid for use with any other locking device in the system. Skilled persons will appreciate that the description of access code sets herein is illustrative in nature and does not limit the scope of this disclosure to any particular arrangement or use of authentication information.

In accordance with at least some embodiments, optical signal generator 404 can be configured to transmit, to electronic locking device 100 via wireless optical signal 102, information comprising an access code and a pointer value associated with the access code. Access control server 460 can generate a random or pseudo-random pointer value corresponding to a position in the set of access codes. Access control server 460 utilizes the random or pseudo-random pointer value to select an access code from the set of access codes for transmission to optical signal generator 404. In various implementations, access control server 460 uses known methods and techniques of random number generation in selecting a random pointer value. For example, in some implementations, access control server 460 employs software code equivalent to a pseudo-random number generator. In other instances, access control server 460 selects a random pointer value using a true random number generator that employs input from radioactive, atmospheric, or other physical phenomena. It will be understood that other known methods for generating a random number may be utilized by access control server 460 to select a random pointer value.

In accordance with various implementations, access control server 460 and electronic locking device 100 may each contain, in memory sites thereof, an identical set of access codes comprising, for example, one hundred access code values. Access control server 460 is configured to randomly select a pointer value associated with the position of a single access code within the set of one hundred access codes stored in memory of the server. To illustrate, if access control server 460 randomly selects a pointer value associated with (i.e. pointing to) the access code in the $25^{th}$ position of the set of the 100 values, access control server 460 can then transmit, to optical signal generator 404, the access code stored in the $25^{th}$ position along with the associated pointer value. Thereafter, optical signal generator 404 transmits to electronic locking device 100, via wireless optical signal 102, the access code along with its associated pointer value. In response, electronic locking device 100 can use the received pointer value to identify an access code stored in memory sites of the locking device (here, the code in the $25^{th}$ position of the code set). If the access code transmitted by optical signal generator 404 matches the corresponding access code stored in memory of electronic locking device 100, an unlocking sequence is initiated. Skilled persons will appreciate that the term "match" is used in this example to denote that the transmitted access code is authorized to operate electronic locking device 100 and that, depending on the desired level of security, electronic locking device 100 may perform a transformation on at least one of the codes prior to comparison. In other examples, authentication information is encrypted by access control server 460 and electronic locking device 100 decrypts the transmitted access code before executing a comparison.

In at least some embodiments, access control server 460 and/or electronic locking device 100 can disable, or otherwise prevent use of, an access code after the code is used by a device to initiate an access event (either successful or unsuccessful). For instance, upon transmitting an access code to optical signal generator 404, access control server 460 can delete the access code from memory sites, increment a pointer, or otherwise disable the access code such that it will not be valid in future access events. Likewise, electronic locking device 100 can delete or disable an access code, for example a code received from optical signal generator 404, immediately after an access event is completed. To illustrate, if access control server 460 and/or electronic locking device 100 contain a set of access codes that are disabled after use, a system administrator can reprogram or modify the server and/or locking device once all access codes have been used and disabled. The administrator can write into memory sites of the server and locking device, a new set of access codes to replace the expired set.

In various embodiments, access control server 460 and/or electronic locking device 100 may temporarily disable an access code after an access event. To illustrate, access control server 460 can be configured to temporarily disable a particular access code following transmission of the access code to optical signal transmitter 404. Access control server 460 may use various known methods to disable the code, such as advancing a pointer, associating a time stamp, setting a variable, etc. In some implementations, access control server 460 disables the access code for a predetermined time period, such as one month. In other implementations access control server 460 disables the access code until all other access codes stored in memory sites of the server have been used. For instance, access control server 460 may have stored, in memory sites thereof, a set of one hundred access codes. Access control server 460 can be configured such that each code is disabled after use (e.g. after the code is transmitted to optical signal generator 404). After all access codes in the set have been used (and thereafter disabled), access control server 460 can be configured to enable all or several of the access codes for use in future access events. In some implementations, access control server 460 is configured to limit reuse of access codes, for example the server can be configured such that access codes may be used no more than 3 times before a new set of access codes must be programmed into memory sites of access control server 460 and/or electronic locking device 100.

In yet other implementations, access control server 460 can be configured to enable a set of access codes for use or reuse after a predetermined percentage of the access codes in memory have previously been transmitted to optical signal generator 404 or otherwise used in an access event. To illustrate, in accordance with at least some embodiments, after 50% of the access codes stored in memory sites of access control server 460 have been used and thereafter disabled, access control server 460 enables all access codes in memory (including codes previously disabled) for use or reuse in future access events. Persons of skill will appreciate that the quantity of access codes or other authentication information stored in memory and the particular conditions for disabling and enabling or reusing authentication information described in this disclosure are illustrative in nature and do not limit other quantities or conditions from being employed in an access control system. For example, in certain access control systems, a set of access codes stored in memory sites of electronic locking device 100 and access control server 460 may contain over one hundred thousand access code values.

In accordance with various embodiments, electronic locking device 100 can store a record of unsuccessful access events (e.g. unauthorized attempts to open) and/or successful access events in memory sites, such as flash memory 118. For instance, when a user of optical signal generator 404 transmits authentication information via wireless optical signal 102, electronic locking device 100 can be configured to store a record of the event, for example by logging the time of the transmission, ID of the user (if transmitted), and information indicating whether or not the user successfully opened electronic locking device 100. Skilled persons will appreciate that information associated with access events is not the only information electronic locking device 100 can record and that other information may have utility in various access control systems. To illustrate one example, electronic locking device 100 can be configured to record information associated with movement of the device, such as a log of signals generated by accelerometer 134. It may also be desired to maintain access control information in memory sites of access control server 460, such as a record of the requests for authentication information received at the server. For example, access control server 460 can store in memory sites associated therewith, information indicating the time and date that authentication information was requested, the identification of the user or device requesting the information, whether authentication information was transmitted to a remote device, and various other access control information as may be utilized by devices in the system.

In accordance with at least some embodiments, electronic locking device 100 can be configured to operate in a low-power or economy mode, whereby power consumption of various electronic components is reduced, for example to conserve power supply 140. Accordingly, electronic locking device 100 can be configured to operate in a default sleep mode wherein particular electronic components (e.g. those energized by power supply 140) consume zero or minimal power. Electronic locking device 100 can be further configured to selectively enable electronic components in response to an optical signal detected by photodetector 130. To illustrate, electronic components of electronic locking device 100 can be enabled and disabled by utilizing a logic gate. For example, via a chip select or slave select pin on a microcontroller or other electrical circuitry operatively associated with the component, or via a disable/enable bit associated with the component. It will be appreciated by skilled persons that any known method for selectively disabling/enabling electronic components can be utilized, such as firmware or software configurations, electronic switches, or even a mechanical switch. It will also be understood that optical signals are but one example of input that can be utilized by electronic locking device 100 to selectively enable components or otherwise exit a low-power mode. Other forms of input can be used as a wake-up signal, for example signals generated by accelerometer 136 that indicate the lock has been subjected to a particular force or pattern of forces.

In some embodiments, optical signal generator 404 can be configured to first transmit a wake-up signal (e.g. short pulse of a visible light signal or a start sequence comprising a specific pattern of visible light flashes) carried by wireless optical signal 102 prior to transmitting authentication information. In this example, microprocessor 112 can be configured to exit a low-power, sleep mode in response to photodetector 130 receiving a wake-up signal or other predefined information. For example, in the low-power, sleep mode, electrical circuitry (e.g. microprocessor 112) of electronic locking device 100 is configured to ignore or otherwise to not process optical signals received at photodetector 130 unless a wake-up signal is first received. To illustrate, electrical circuitry can be configured such that it does not sample (e.g. for analog-to-digital conversion) the optical signal input at photodetector 130 unless a wake-up signal is first received. Upon receipt of the wake-up signal, electrical circuitry can be configured to enter an event initiation state. The electrical circuitry can be configured, in the event initiation state, to sample the optical signal for conversion to a corresponding electrical signal. The optical signal may be sampled for a predetermined period of time or, for instance, until receipt of a second signal similar to the wake-up signal. In other implementations, electrical circuitry may, in a low power consumption state, sample the optical signal but may be configured such that it does not perform any additional processing (e.g. by forgoing attempts to compare the received information with access control information stored in memory sites). In this manner, electronic locking device 100 can reduce energy consumption and conserve power supply 140 by not needlessly processing optical signals that are not related to the communication of access control information. To illustrate, electronic locking device 100 can be installed on an entry point that is located near an artificial light source, such as a security floodlight. The artificial light source may be positioned in a manner such that it inadvertently delivers optical signals to photodetector 130. In implementations utilizing a wake-up signal, the wake-up signal can be defined to contain information that would not typically be present in optical signals emitted by artificial light sources designed to illuminate buildings or outdoor areas. In this manner, electronic locking device 100 can be configured to ignore or to not process the optical signals received from the artificial light source. In other implementations, microprocessor 112 can be configured to enable various components of the locking device, such as wireless communication module 120, upon photodetector 130 receiving a wake-up signal.

In various embodiments, wireless optical signal 102 is implemented as a unidirectional communication channel, facilitating transmission of information from optical signal generator 404 to electronic locking device 100. Power consumption of electronic locking device 100 may be reduced significantly by limiting communication during unlocking/locking access events to a unidirectional channel (i.e. from optical signal generator 404 to electronic locking device 100 via wireless optical signal 102). The present inventor recognized that transmitting authentication information during access events via a unidirectional communication channel can improve the responsiveness of the system by reducing or eliminating the occurrence of significant delays or interruptions associated with configuring or establishing a bidirectional communication interface, such as Bluetooth. Moreover, implementing wireless optical signal 102 as a unidirectional communication channel can reduce the need for the communicating device (e.g. optical signal generator 404) to include specialized communication circuitry requiring additional configuration prior to transmission, thereby improving usability in access control systems that may be used by transient or one-time users. To illustrate, in accordance with various embodiments of this disclosure, a unidirectional communication channel can be implemented using any component configured to generate a light signal, such as an LED or other light source associated with a conventional display screen, thereby permitting a user desiring to transmit authentication information to electronic locking device 100 to utilize a wide range of commercially available electronic devices. Moreover, use of a light source associated with the display screen may not require the user to configure the device prior to transmission of wireless optical signal 102, thereby saving time and reducing the risk of user error.

Figure 6:
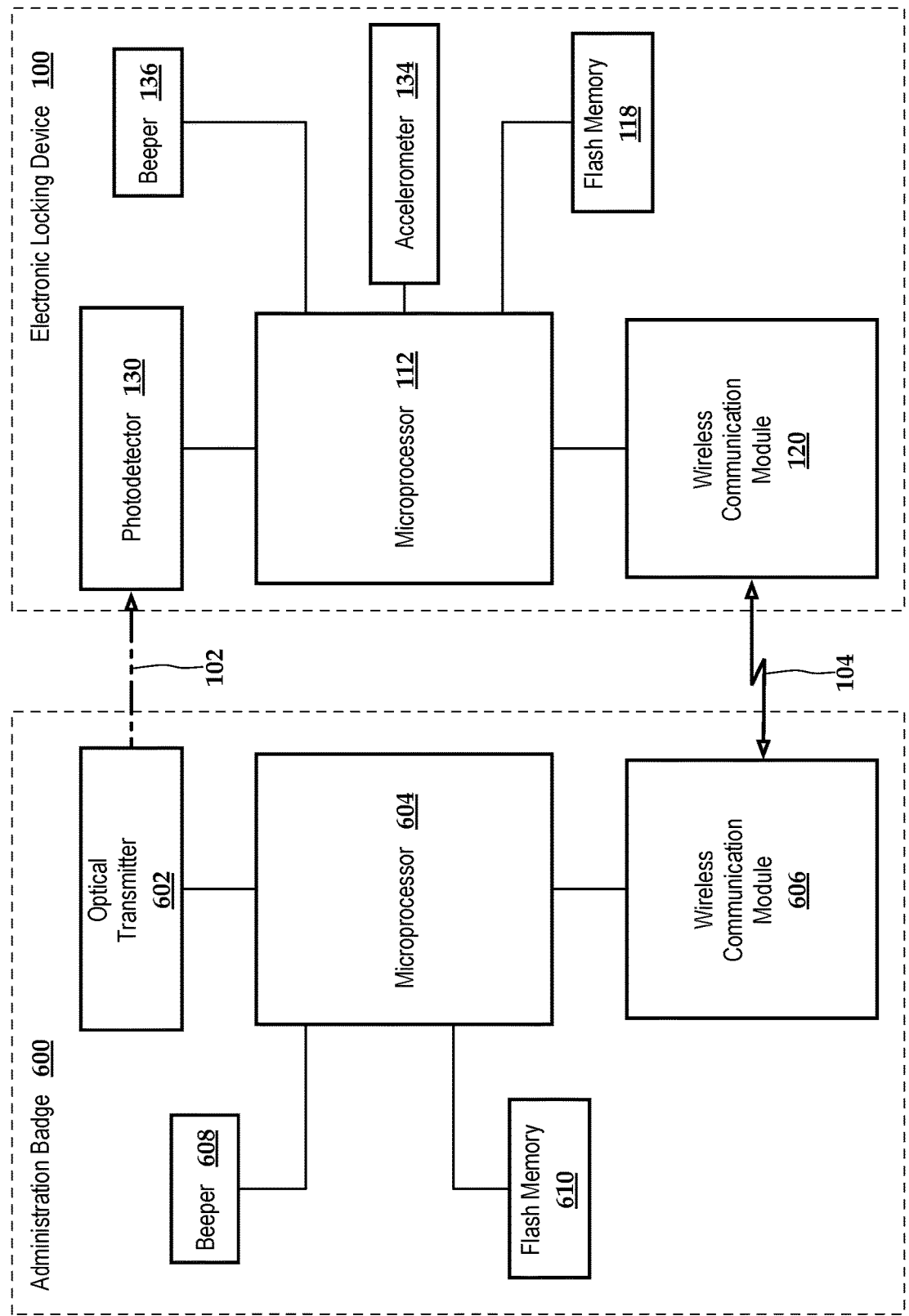
FIG. 6 is a block diagram illustrating example communication interfaces between communication circuitry of an administration badge and communication circuitry of an electronic locking device.

If wireless optical signal 102 is indeed configured as a unidirectional communication channel, access control information can be retrieved or downloaded from electronic locking device 100 using alternate communication channels or interfaces. Turning now to FIG. 6, in at least some embodiments, an administration badge 600 can be configured to exchange access control information with electronic locking device 100. Administration badge 600 can be any device capable of communicating with wireless communication module 120 such as a smart device, including commercially available smartphones, tablets, laptop computers, smart watches, and other electronic devices comprising circuitry capable of bidirectional wireless communication. As illustrated in FIG. 6, administration badge 600 comprises, in various implementations, an optical transmitter 602, a microprocessor 604, and a wireless communication module 606. Optical transmitter 602 can be any device capable of transmitting an optical signal such as an LED or IR transceiver. Wireless communication module 606 can be any wireless communication circuitry capable of communicating via various known methods and protocols of wireless communication including infrared, IEEE 802.11x, Wi-Fi Direct, Bluetooth, Zigbee, NFC, and/or other wireless communication methods and protocols known to skilled persons. Optical transmitter 602 and wireless communication module 606 can be implemented as a single communication device or, in other implementations, be arranged separately and each operatively associated with microprocessor 604 via wired or wireless links. In at least some implementations, administration badge 600 may further comprise flash memory 608 and a beeper 610.

It will be understood that FIG. 6 is intended to illustrate the communication interface between administration badge 600 and electronic locking device 100. Accordingly, other elements may not be depicted in FIG. 6, such as a source of electrical power. Skilled persons will appreciate that other modules and elements may have utility in administration badge 600 and that the components depicted in FIG. 6 are for illustration purposes only and not intended to limit the arrangement of administration badge 600 in any way. Although administration badge 600 is described in this disclosure as being independent of optical signal generator 404, it will be understood by skilled persons that optical signal generator 404 and administration badge 600 can be implemented as a single smart device. For instance, a smart device, such as a commercially available smartphone, can be configured to operate as optical signal generator 404 (e.g. configured to transmit authentication information via a unidirectional optical communication signal) and administration badge 600 (e.g. configured to exchange access control information via a bidirectional communication interface). In other implementations, administration badge 600 can be configured to operatively couple to optical signal generator 404, for example via a USB or other electronic data port.

Bidirectional communication methods and technologies can be employed to facilitate the exchange or retrieval of voluminous categories of access control information, such as audit trail information including records of all or a portion of the previous access events at the locking device. Skilled persons will understand that the term "audit trail" refers to any information associated with events that have occurred or are occurring at a device, and may include information associated with previous unlocking events, denied access events, low battery alerts, updated access permissions, and so forth. Here, this information can be retrieved separately from authentication information or other forms of access control information. In other implementations, such as where optical signal generator 404 and administration badge 600 are implemented as a single electronic smart device, access control information such as audit trail information can be retrieved via bidirectional communication methods contemporaneously with transmission of authentication information via unidirectional optical signals emitted by the same device. When retrieving certain information, a system administrator or user may value the high-bandwidth of certain bidirectional communication protocols over responsiveness and reliability of the system. To illustrate, if a user of the system simply desires to gain access to a door or enclosure, the user may expect or even demand that the access procedure be nearly instantaneous. Conversely, if a system administrator desires to retrieve access control information from devices in the system, the administrator may expect the process to entail additional time, such as time associated with configuration of administration badge 600 to perform the desired communication. Accordingly, delays associated with pairing devices or configuration processes necessary to establish a bidirectional wireless communication interface may be tolerable during retrieval of voluminous access control information (e.g. audit trails) or maintenance, whereas such delays may not be tolerable by a user wishing merely to access a locking device.

To illustrate further, a system administrator may desire to periodically retrieve access control information stored in memory sites (e.g. flash memory 118) of electronic locking device 100, such as audit trail information associated with previous access events in order to review user access details at the locking device. As illustrated in FIG. 6, transmission of wireless optical signal 102 can initiate or enable electronic locking device 100 for communication, for example where electronic components of electronic locking device 100 are configured in a default sleep or low-power mode. Here, the signal to initiate (i.e. wake up) electronic locking device 100 can be an optical signal comprising, for example, a particular pattern, frequency, intensity, or other signal characteristic that can be detected by photodetector 130. Administration badge 600 can be configured to generate wireless optical signal 102 (e.g. to wake up electronic locking device 100) in response to an action or event. For example, in some implementations administration badge 600 is configured to periodically transmit wireless optical signal 102, such as transmitting recurring signals every second. In others, the badge is configured to transmit wireless optical signal 102 in response to an action by the user or administrator, for instance upon the user actuating a button or switch on administration badge 600. If photodetector 130 detects a signal from administration badge 600 via wireless optical signal 102, microprocessor 112 can be configured to activate wireless communication module 120 and initiate establishment of BWC interface 104. Skilled persons will appreciate that administration badge 600 and electronic locking device 100 can be configured to establish BWC interface 104 without use of an optical or other wake-up signal. For instance, the use of low-power or sleep modes for various components of electronic locking device 100 may have utility in certain implementations but not in others.

Administration badge 600 can be configured to request access control information from electronic locking device 100. In certain implementations, administration badge 600 can, contemporaneously with exchange of information, write a time stamp into flash memory 608 (or into memory sites of the locking device). Subsequently, administration badge 600 can be configured to request the access control information that was written to memory sites of electronic locking device 100 during the time elapsed since administration badge 600 last retrieved access control information from that device. In yet other implementations, administration badge 600 can prompt the administrator to select the time period for which access control information is desired. Skilled persons will appreciate that administration badge 600 can be configured to retrieve information from electronic locking device 100 as desired, for example administration badge 600 can be configured to request all of the access control information stored in memory sites of electronic locking device 100. Administration badge 600 can be configured to generate a perceptible alert upon successful retrieval of access control information, for example via beeper 610 or a similar device capable of generating perceptible signals, such as visual or tactile signals.

In various embodiments, administration badge 600 can be configured to transmit access control information to electronic locking device 100 via BWC interface 104. To illustrate, administration badge 600 can transmit authentication information, such as access codes, to the locking device. Here, rather than transmitting access codes to initiate an access event, authentication information can be transmitted to electronic locking device 100 to modify information stored in memory sites of electronic locking device 100. To illustrate, random access codes or other forms of authentication information can be written into memory sites of administration badge 600 (e.g. using access control server 460). Upon establishment of BWC interface 104, between administration badge 600 and electronic locking device 100, administration badge 600 can be configured to transmit the authentication information to electronic locking device 100. In some implementations, administration badge 600 can transmit authentication information along with instructions to replace previously used or expired access codes stored in memory sites of the locking device, such as flash memory 118. In other implementations, administration badge 600 can transmit information to electronic locking device 100 that includes instructions to open or unsecure the device at a specified time in the future (e.g. at 8:00 am, every weekday), irrespective of whether the locking device receives authentication information from a user at the specified time. In response to receiving authentication information from administration badge 600, electronic locking device 100 can be configured to write the information (e.g. access codes) to memory sites, for example to replace or supplement access codes already existing in memory of the locking device. In this manner, the authentication information used to operate electronic locking device 100 may be modified, for example if authentication information associated with the locking device is compromised or exhausted. Skilled persons will appreciate that administration badge 600 can be configured to transmit other types of access control information, for example access event records associated with other devices in the system, firmware updates, bug fixes, or instructions to blacklist or otherwise revoke access permissions for a user or device, to identify just a few examples.

In accordance with at least some embodiments, access codes or other authentication information can be generated by the manufacturer of the access control system and provided to a system administrator or user of the system. In other embodiments, a system administrator or user of the system can generate access codes for use in the access control system, for example by employing a pseudo-random or true random number generator. For instance, a system administrator can utilize physical phenomena to generate truly random access codes for use in a particular access control system. As described elsewhere in this disclosure, access codes may comprise any appropriate information that is capable of electronic storage and transmission, for example binary data obtained from an analog to digital converter that is operatively associated with a hardware random number generator.

Various methods and techniques of generating authentication information can be utilized. For instance, if the security requirements of the access control system demand the use of truly random access codes, or if such randomness is desired by the administrator of the system, a hardware random number generator can be employed, using, as an input source, any appropriate physical phenomena. In some implementations it may be desired to use a Geiger counter to measure radioactive decay. In other implementations it may be desired to measure thermal noise or atmospheric noise. Skilled persons will appreciate that many alternative physical phenomena and hardware can be employed, in tandem, to generate truly random data. An analog to digital converter, for example, can be used to transform the signals generated by the hardware random number generator into binary data. Access codes of appropriate bit-length (which can vary based on system design and desired level of security) can be formed based on at least a portion of the randomly generated binary data and transmitted to the appropriate devices according to known methods and techniques described in this disclosure.

Figure 7A:
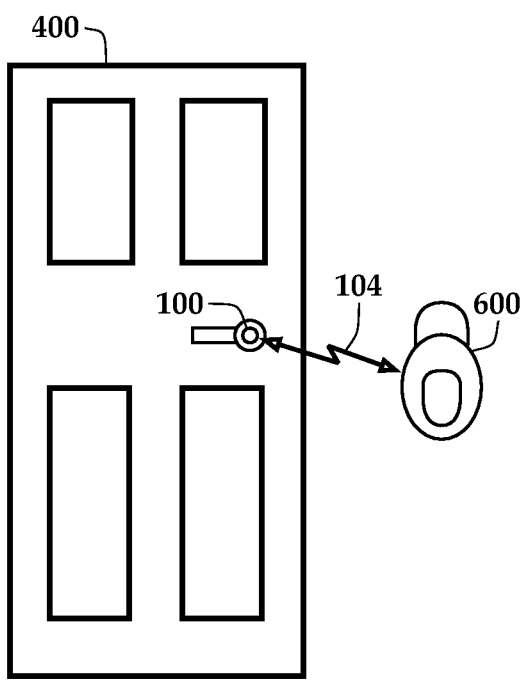
FIG. 7A is a block diagram illustrating example communications between an administration badge and an electronic locking device.

Referring to FIG. 7A, in accordance with at least some embodiments, administration badge 600 can be presented to electronic locking device 100 to establish a communication link for transmission or exchange of access control information. In this example, electronic locking device 100 is operatively coupled to door 400 to selectively restrict opening of the door. Electronic locking device 100 can be configured to record access event information associated with access to door 400, such as the time and date of each opening or attempted opening of the door. Here, access event information can be retrieved from electronic locking device 100 by establishing BWC interface 104 between communication circuitry of administration badge 600 and wireless communication module 120 of electronic locking device 100. In accordance with various embodiments where administration badge 600 is presented within a short distance to electronic locking device 100, BWC interface 104 can be implemented as a wireless personal area network (WPAN). Skilled persons will understand that a WPAN can be implemented using a variety of short range wireless communication technologies, including Bluetooth, IrDA, Z-Wave, ZigBee, and so forth. Using a low-bandwidth wireless communication protocol to implement BWC interface 104, such as those specified by IrDA, may aid in minimizing power consumption of electronic locking device 100. Indeed, in accordance with some implementations, administration badge 600 comprises communication circuitry (e.g. IR transceiver) capable of transmitting and receiving information formatted according to IrDA or similar infrared-based protocols known to skilled persons. It will be appreciated that BWC interface 104 between administration badge 600 and electronic locking device 100 may not necessarily be implemented in a manner that establishes a WPAN and can be implemented using any known wireless communication protocol as desired, such as Bluetooth, Zigbee, NFC, Wi-Fi Direct, and others known to skilled persons.

Administration badge 600 can, for instance, request access control information that was written to memory sites of electronic locking device 100 after a specified date and time, or after a particular event was recorded by the locking device. To illustrate, upon establishing BWC interface 104, administration badge 600 can be configured to transmit a message to wireless communication module 120 (of electronic locking device 100) that includes instructions to retrieve all access control information written to memory sites of the locking device during the previous seven days. Upon receipt of the message, wireless communication module 120 can be configured to send the message to microprocessor 112 which responds by returning, to wireless module 120 for transmission to administration badge 600, all access control information written to memory sites of electronic locking device 100 (e.g. flash memory 118) in the seven-day period immediately preceding receipt of the message. After transmission of the access control information by wireless module 120, electronic locking device 100 can be configured to return to a default sleep state in order to minimize power consumption.

Figure 7B:
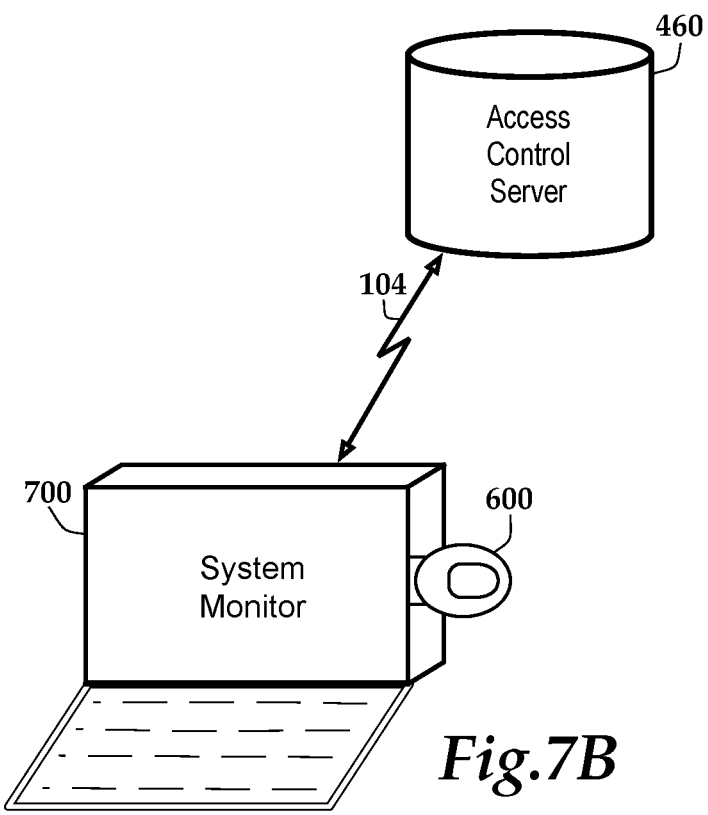
FIG. 7B is a block diagram illustrating example communications between an administration badge and a system monitor and example communications between the system monitor and an access control server.

In accordance with various embodiments, access control information can be transmitted from administration badge 600 to another electronic device. For example, information can be transmitted to a separate device to display the information or to use the information in connection with administration or maintenance of the system. Referring now to FIG. 7B, administration badge 600 can transmit access control information to a system monitor 700. System monitor 700 can be a commercially available computing device such as a laptop or desktop computer. Alternatively, system monitor 700 can be a smart device, such as a smartphone, tablet, or other electronic device capable of displaying information to the system administrator, for example on a display screen associated with the device. In yet other implementations, administration badge 600 and system monitor 700 can be implemented as a single smart device, such as a smartphone or tablet. Administration badge 600 can be configured to transmit access control information to system monitor 700 via known methods and technologies. For instance, if administration badge 600 includes a universal serial bus (USB) plug and system monitor 700 includes at least one universal serial bus (USB) socket, administration badge 600 can transmit access control information to system monitor 700 via the USB socket. Alternatively, administration badge 600 can transmit access control information to system monitor 700 using wireless communication methods, for example via the wireless communication circuitry used by administration badge 600 to establish BWC interface 104 with electronic locking device 100. Upon receipt of access control information, system monitor 700 can be configured to display the information to a user or administrator, for example via a graphical user interface on a display screen. In some implementations, system monitor 700 can be configured to use at least a portion of the access control information to update a system database or otherwise modify information in memory sites associated with the access control system. In other implementations, system monitor 700 can be configured to transmit a message to a remote device or initiate an alarm or other perceptible signal if the access control information received from administration badge 600 indicates that a particular event has occurred, for example numerous unauthorized access attempts at a certain entry point.

In accordance with at least some embodiments, system monitor 700 can be configured to transmit access control information to a remote device, such as access control server 460. For example, system monitor 700 can exchange information with access control server 460 using similar wired or wireless methods and technologies as have been described elsewhere in this disclosure. In some implementations, system monitor 700 is configured to transmit, to access control server 460, access control information associated with each electronic locking device 100 in the system. To illustrate, administration badge 600 can be used to retrieve access control information from electronic locking devices and thereafter transmit the retrieved information to system monitor 700. System monitor 700 can be configured to automatically transmit the information received from administration badge 600 to access control server 460. In other implementations, system monitor 700 can be configured to transmit access control information to access control server 460 in response to a command or other action by the user or administrator, or upon expiration of a specified time period.

Access control server 460 can use access control information from the various electronic locking devices in the system in order to synchronize or merge the access control information between memory sites of the server and memory sites of the locking devices. Skilled persons will appreciate that synchronization of access control information across multiple devices can provide redundancy in an access control system, thereby improving reliability in the event of a device failure. In some implementations, synchronization of information can be used to compensate for inherent limitations in the communication methods employed by various devices, for example if certain devices employ unidirectional communication channels. To illustrate, access control server 460 can record information associated with transmission of an access code to optical signal generator 404. However, for various reasons, a user of optical signal generator 404 may ultimately elect not to transmit the access code to electronic locking device 100. In some situations, the user may wish to simply test generation of wireless optical signal 102 without intending to position optical signal generator 404 for transmission to electronic locking device 100. In other instances, the user of optical signal generator 404 may experience technical difficulties upon receiving the access code from access control server 460 and elect to request a new access code without first attempting to access electronic locking device 100. Here, if wireless optical signal 102 is implemented as a unidirectional communication channel it may not be practical for optical signal generator 404 to provide feedback to access control server 460 regarding whether authentication information was successfully transmitted to a locking device. However, access control information can later be retrieved from electronic locking device 100 when delays associated with the exchange of information are not likely to impact the utility of the system. By synchronizing, or merging the information between access control server 460 and electronic locking device 100, the system administrator can receive a more comprehensive record of events in the access control system. The system administrator can use the merged access control information to make modifications to the system or to troubleshoot system errors. For example, the system administrator may want to understand how often access codes are transmitted (from access control server 460) to a particular optical signal generator 404 and compare that information with the number of successful or unsuccessful access events actually initiated by the same optical signal generator.

In accordance with various embodiments, electronic locking device 100 can be configured to transmit, via wireless communication module 120, access control information to various electronic devices of the access control system. In some implementations, power consumption can be increased to obtain frequent or even real-time exchange of information concerning the use or status of electronic locking device 100. To illustrate, electronic locking device 100 can be configured such that it periodically transmits, via wireless communication module 120, access control information regarding the status of the locking device (e.g. indicating whether the device is secured or unsecured). Wireless communication module 120 can transmit access control information to access control server 460, or to another electronic device in the access control system. Depending on the arrangement of the access control system and the proximity of electronic locking device 100 to access control server 460, this transmission can be facilitated using communication network 450 (e.g. a WLAN, LPWAN, or WWAN such as a cellular network). In other implementations, this can be accomplished by directly transmitting access control information from wireless communication module 120 to compatible communication circuitry of access control server 460, for example via a WPAN using Bluetooth or other wireless communication protocols.

Access control information concerning the status (e.g. secured or unsecured) of electronic locking device 100 may comprise information generated by various electronic components of the locking device, such as accelerometer 134. For instance, signals generated by accelerometer 134 can be used to determine a position of the locking device. To illustrate, if electronic locking device 100 is in an unsecured state, accelerometer 134 may generate signals that are not typically produced when the device is in a secured state. Signals generated by accelerometer 134 can likewise indicate if the device (or a component thereof) is in a nonfunctional or emergency state, such as after or during unauthorized tampering. Electronic locking device 100 can be configured to modify a lock status variable or other information stored in memory sites of the device based, at least in part, on signals generated by accelerometer 134. In some configurations, electronic locking device 100 can be equipped with other hardware to detect the position or orientation of elements of the locking device, such as an electrical contact configured to generate a signal based on the position of a blocking member. Skilled persons will understand that a variety of components and devices can be used to provide information regarding the position or orientation of various elements of the locking device and that the accelerometer and electrical contact described herein are illustrative in nature and are not intended to restrict inclusion of other devices in various embodiments.

Figure 8:
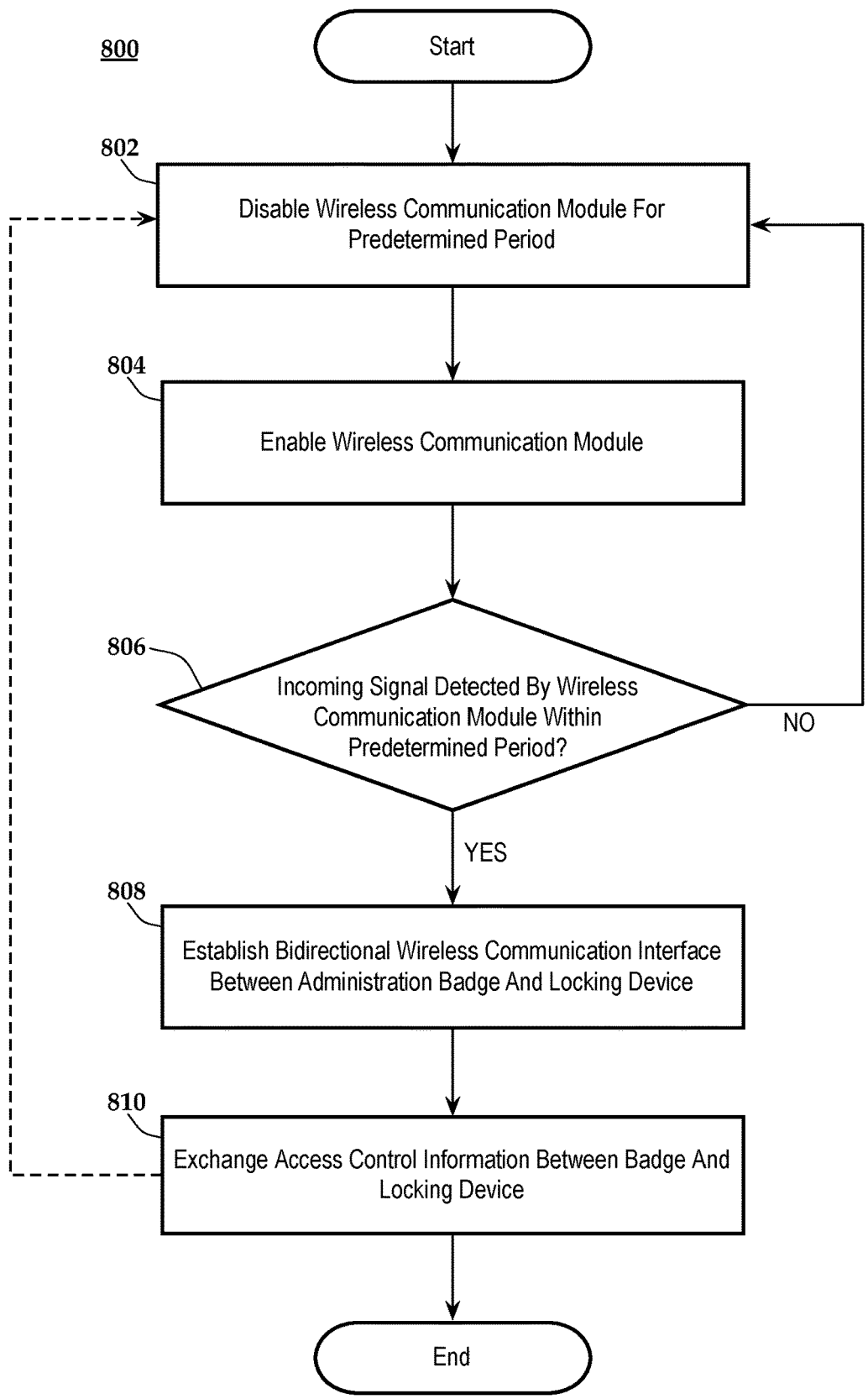
FIG. 8 is a flowchart illustrating an example method of establishing a bidirectional communication interface between an administration badge and an electronic locking device.

In assorted implementations, electronic locking device 100 can be configured to wake up for brief periods to listen for or act upon incoming messages or signals, for example from administration badge 600. Referring now to FIG. 8, an example method 800 for establishing a communication link between electronic locking device 100 and administration badge 600 will be described in accordance with at least some embodiments of this disclosure. The method 800 begins at step 802 where microprocessor 112 disables wireless communication module 120 for a predetermined duration, such as 50 milliseconds (ms). Next, the method proceeds to step 804 where microprocessor 112 enables wireless communication module 120. In step 806, wireless communication module 120 is configured to operate in listen mode or to otherwise detect incoming wireless signals (e.g. from administration badge 600) for a predetermined period of time, said predetermined period being shorter than the disabled period in step 802. For example, depending on the particular communication protocols employed by electronic locking device 100 and administration badge 600, wireless communication module 120 can be enabled for a period no greater than 50% of the disabled period described in step 802.

If wireless communication module 120 detects an incoming signal from administration badge 600 in step 806, the method proceeds to step 808 where BWC interface 104 is established between communication circuitry of electronic locking device 100 and communication circuitry of administration badge 600. Otherwise, if wireless communication module 120 does not detect an incoming signal from administration badge 600 within the predetermined period of time in step 806, the method returns to step 802 where wireless communication module 120 is again disabled. Skilled persons will appreciate that the length of the predetermined periods of time that wireless communication module 120 is disabled and enabled may depend, at least in part, on the wireless communication protocols utilized. The specific values described herein are illustrative in nature and other durations may have utility in various embodiments of this disclosure.

Upon establishing BWC interface 104 in step 808, administration badge 600 and electronic locking device 100 can be configured to exchange information in step 810, including access control information such as access codes or information associated with prior access events written to memory sites of the locking device. Upon completion of the desired information exchange in step 810, the method may optionally return to step 802, for example if further communication is anticipated. If it is indeed desired to return to step 802 upon completion of communication in step 810, the duration of the time periods in step 802 and step 806 can be configured such that a low duty cycle for wireless communication module 120 is achieved while still preserving responsiveness of wireless communications and overall locking device functionality. For example, if BWC interface 104 is implemented using IrDA communication protocols, the predetermined period that wireless communication module 120 is disabled in step 802 may be short enough that any associated delay is not perceptible to users of the system (e.g. 50 ms). By achieving a low duty cycle for energy intensive electronic components, such as wireless communication module 120, overall power consumption of electronic locking device 100 is thereby reduced. Skilled persons will appreciate that configuring electronic components, such as wireless communication module 120, to operate in a low-power mode may not be appropriate in every system. For instance, in accordance with some implementations it may be desired for wireless communication module 120 to operate in a listen mode indefinitely, wherein microprocessor 112 is not configured to periodically disable communication circuitry to conserve power supply 140.

Figure 9:
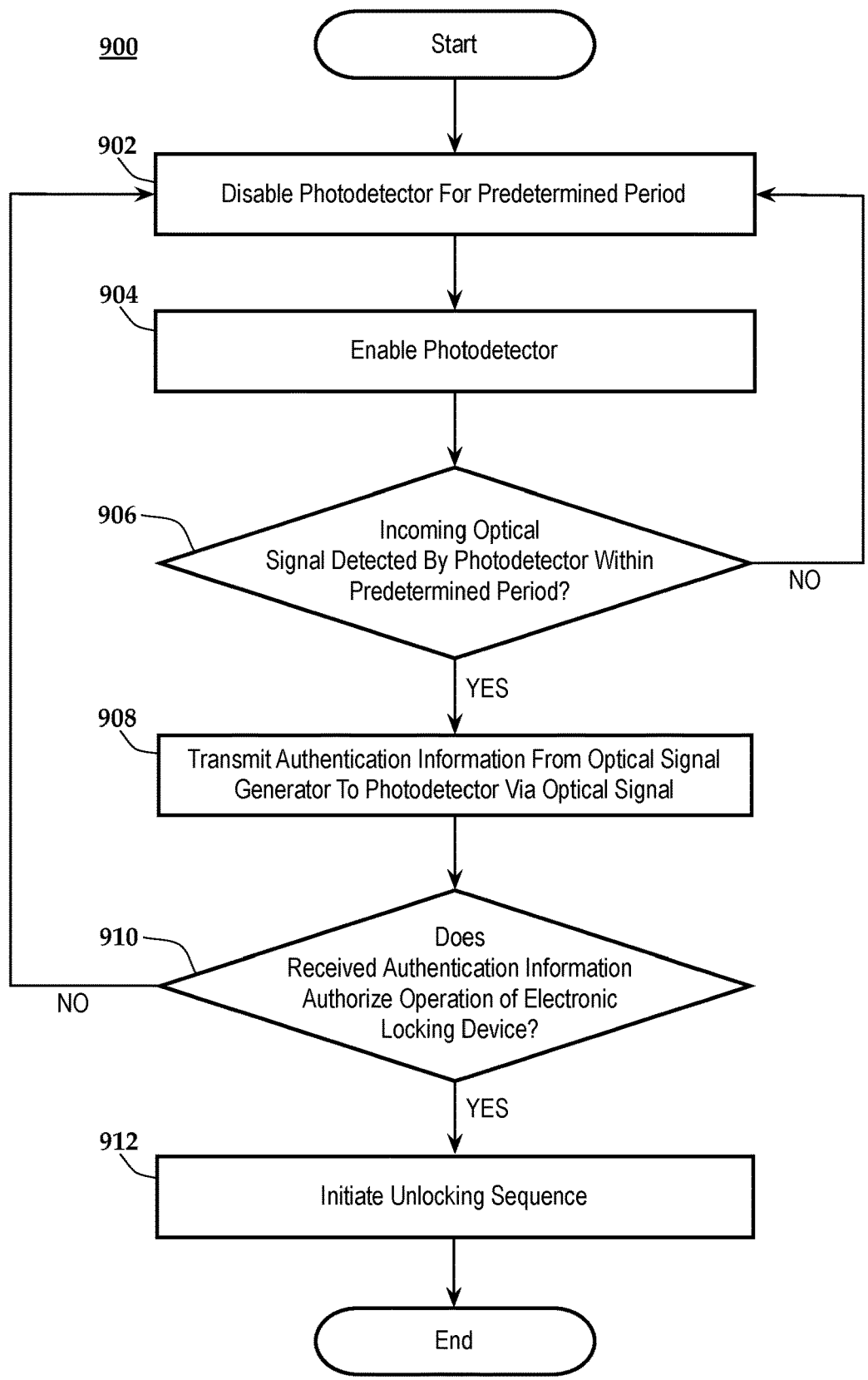
FIG. 9 is a flowchart illustrating an example method of initiating an access event at an electronic locking device by transmitting optical communication signals from an optical signal generator to the electronic locking device.

Similar methods and techniques may be used with respect to other electronic components in electronic locking device 100. Referring now to FIG. 9, an example method 900 for initiating an unlocking event of electronic locking device 100 will be illustrated in accordance with at least some embodiments. The method 900 begins at step 902 where microprocessor 112 disables photodetector 130 for a predetermined duration, for example 50 ms. Next, the method proceeds to step 904 where microprocessor 112 then enables or otherwise causes delivery of increased electrical power to photodetector 130. In step 906, photodetector 130 is configured to detect incoming optical signals from a remote source (such as optical signal generator 404) for a predetermined period of time, this enabled period being shorter than the disabled period described in step 902. For example, photodetector 130 may be enabled for a period no greater than 10% of the disabled period described in step 902. If photodetector 130 detects an optical signal from optical signal generator 404 during the time period described in step 906, the method proceeds to step 908 where optical signal generator 404 transmits authentication information to electronic locking device 100 via wireless optical signal 102. Skilled persons will appreciate that an optical signal detected by photodetector 130 in step 906 may indeed comprise authentication information and that detection (step 906) and transmission of authentication information (step 908) are described as separate steps for clarity purposes only. Otherwise, if photodetector 130 fails to detect an incoming signal from optical signal generator 404 within the predetermined period of time in step 906, the method returns to step 902 where photodetector 130 is again disabled. The length of the predetermined periods of time that photodetector 130 is disabled and enabled may vary, depending for example on the type of optical signals utilized (e.g. VLC versus IRC versus UVC), the desired power consumption of electronic locking device 100, and the desired responsiveness of the device.

Upon receiving authentication information from optical signal generator 404 in step 908, the method proceeds to step 910 where photodetector 130 transmits the authentication information to microprocessor 112. Microprocessor 112 compares the received authentication information with authentication information or other access control information stored in memory sites (e.g. flash memory 118) of electronic locking device 100. If microprocessor 112 determines that the authentication information received in step 908 authorizes the user to operate electronic locking device 100, it may initiate an unlocking sequence in step 912, for example by causing delivery of increased electrical power to electric motor 150 to actuate a blocking member or other device restricting access to the entry point. Conversely, if microprocessor 112 determines that the authentication information received in step 908 does not authorize the user to access electronic locking device 100, the method may return to step 902 where photodetector 130 is again disabled (the method can be repeated if desired, with photodetector 130 alternating between sleep/listen states). Similar to the power cycling of wireless communication module 120, achieving a low duty cycle for photodetector 130 reduces power consumption of electronic locking device 100 while retaining operational responsiveness of the locking device, for example during access events.

The period of time that photodetector 130 is disabled may be such a short duration that it is not perceptible to human users of the system, and may appear instantaneous to users during normal operation. Skilled persons will appreciate that the method described in FIG. 9 is illustrative in nature and that in some implementations it may be desired to configure photodetector 130 to operate in a listen mode indefinitely to maximize responsiveness.

Figure 10:
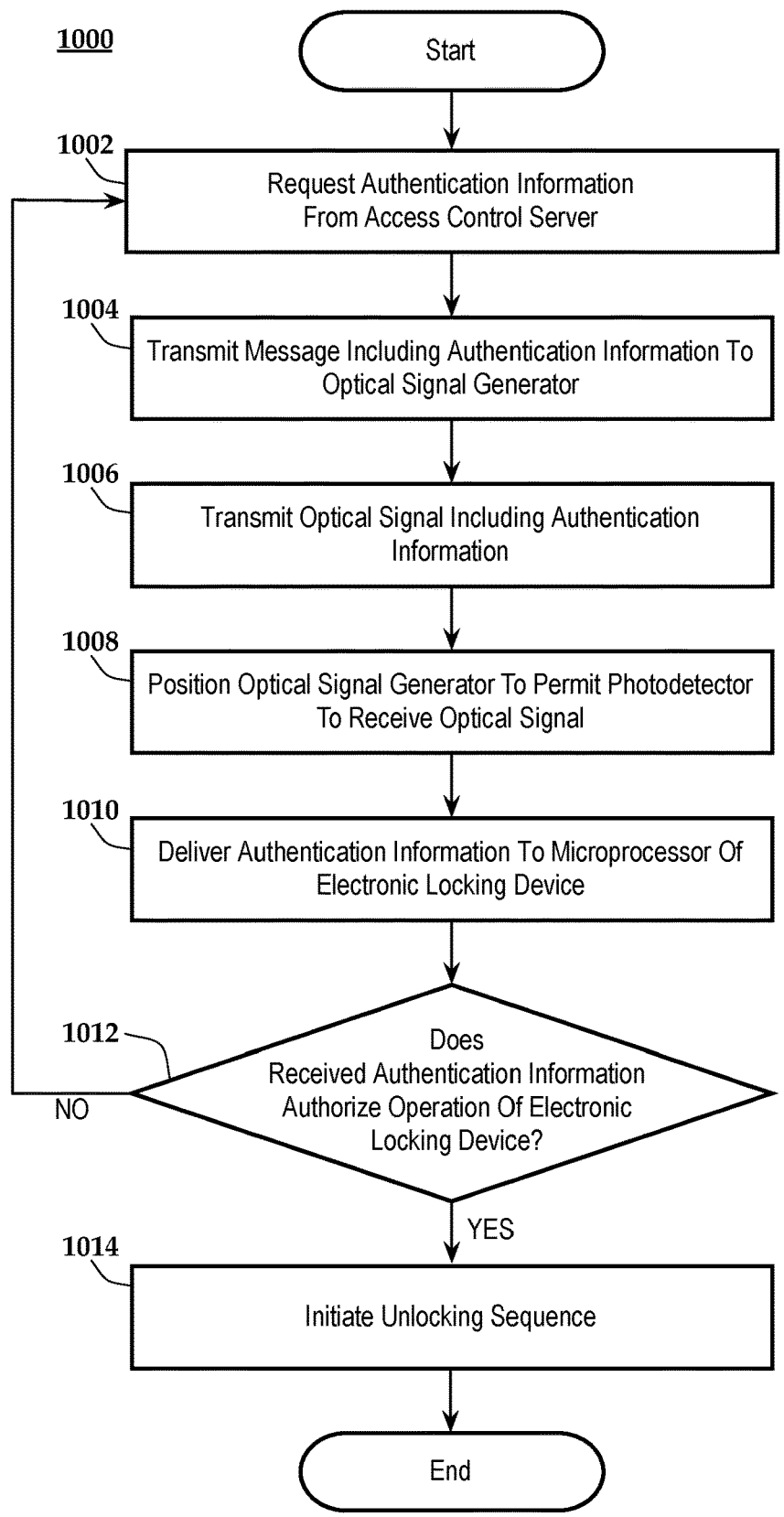
FIG. 10 is a flowchart illustrating an example method of initiating an access event at an electronic locking device with an optical signal generator, wherein the optical signal generator obtains authentication information from an access control server located away from the optical signal generator.

FIG. 10 illustrates an example method 1000 for operation of electronic locking device 100 wherein optical signal generator 404 obtains authentication information from a remotely located electronic device in accordance with various embodiments. The method 1000 begins at step 1002 where a user of optical signal generator 404 initiates transmission of an electronic message (e.g. HTTP message) to access control server 460, the message comprising a request for access control information. Skilled persons will understand that reference to the access control information may not be explicit in the electronic request message, for example the electronic message may include an HTTP GET instruction that requests a webpage or other web resource that is associated with access control information. Here, optical signal generator 404 can transmit the request message using known wireless communication protocols (e.g. wireless communication via a WLAN, or via a WWAN such as a cellular data network). In accordance with various embodiments, the user of optical signal generator 404 can direct a web browser application executing on optical signal generator 404 to a particular web address associated with access control server 460. In this manner, optical signal generator 404 may act as a client device in accessing access control server 460 in accordance with known client-server principles. In some implementations, a user can enter a web address directly into the web browser, for example if optical signal generator 404 comprises a keyboard or is otherwise capable of accepting touchscreen input via a touchscreen display. In other implementations, navigation to the appropriate webpage can be accomplished using a link to the web address, for instance by selecting, from an email or other electronic message, a hyperlink with a reference to the webpage.

Although example method 1000 is further described below as being implemented with a web browser application configured to retrieve access control information from a webpage hosted by access control server 460, it will be understood that other software applications and communication methods may have utility in various embodiments. For example, in accordance with some embodiments, the user can employ a dedicated mobile app software application executing on optical signal generator 404 that is configured to exchange electronic messages (e.g. via the Internet or other communication network) with access control server 460. For example, if optical signal generator 404 is implemented as a commercially available smartphone with an Android-based operating system installed thereon, the user can employ a dedicated native mobile application written, for instance, in Java and configured to exchange electronic messages related to access control information. If optical signal generator 404 is implemented as a smartphone having an iOS (i.e. Apple) operating system, the dedicated native mobile application can be written in Objective-C. Alternatively, the user can utilize a mobile web application. Here, the mobile web application can execute within a web browser application and can be written, for example, in JavaScript, Cascading Style Sheets (CSS), HyperText Markup Language (HTML), HTML5, or other similar languages. In yet other implementations, the user can employ a hybrid mobile application that uses native code (e.g. Java or Objective-C) and web code (e.g. JavaScript, CSS, HTML, HTML5). Skilled persons will appreciate that these are just a few examples of mobile app software applications that can be used to configure optical signal generator 404 to exchange access control information with access control server 460 through a computer network or other communications link.

The content of the request message delivered to access control server 460 in step 1002 may vary based on the desired security of the system. For instance, in some implementations, the request message comprises instructions for access control server 460 to transmit (or provide in the webpage) authentication information for a particular electronic locking device 100. In other implementations, the request message additionally comprises instructions to transmit information associated with a login process whereby the user of optical signal generator 404 is prompted to enter (e.g. via keyboard or touchscreen in communication with optical signal generator 404) identifying information associated with the user, such as a user name or user ID and password, prior to receiving access control information from the server. In yet other implementations, access control server 460 can be configured to automatically provide, upon receipt of a request message from a device, a webpage comprising a login or other authentication process.

Next, the method proceeds to step 1004 where access control server 460 transmits to optical signal generator 404, or otherwise provides via the webpage, authentication information that is responsive to the request message. In accordance with various embodiments, access control server 460 can transmit authentication information along with instructions causing optical signal generator 404 to present the authentication information as wireless optical signal 102 in step 1006, for example by causing the light source of a display screen associated with optical signal generator 404 to emit visible light at a certain frequency, intensity, or other measurable characteristic. In other implementations, access control server 460 can provide a webpage for display in the web browser application executing on optical signal generator 404. Access control server 460 can configure the webpage to display an animation, video, or other dynamic image such that visible light signals emitted by the display screen convey the requested authentication information or other access control information. In various embodiments, optical signal generator 404 can be configured to continue transmitting authentication information via wireless optical signal 102 for a predetermined time, or until user action interrupts the transmission, for example by actuating a button associated with optical signal generator 404 or by stopping or pausing execution of the web browser application.

In step 1008, the user positions optical signal generator 404 to facilitate delivery of wireless optical signal 102 to photodetector 130 of electronic locking device 100. Depending on the optical protocols used in implementing wireless optical signal 102, the user can orient a light source associated with optical signal generator 404 (e.g. display screen, LED, etc.) in a position that enables optical signals generated by the light source to be received at photodetector 130. To illustrate, the user can position optical signal generator 404 such that the light source is within 90 degrees of a line-of-sight between the light source and photodetector 130. In other implementations, the user may position optical signal generator 404 such that a surface of optical signal generator 404 is in contact with electronic locking device 100. However, the desired orientation of optical signal generator 404 may vary with the design of the access control system and the communication protocols used to implement wireless optical signal 102.

Photodetector 130 receives the authentication information via wireless optical signal 102 in step 1010 and converts the optical signal to a corresponding electrical signal (carrying the authentication information) to provide to microprocessor 112. Next, in step 1012, microprocessor 112 compares the received authentication information with authentication information, or with other access control information, stored in memory sites (e.g. flash memory 118) of electronic locking device 100. If microprocessor 112 determines that received authentication information corresponds to stored authentication information in a manner authorizing access, it causes delivery of increased electrical power to electric motor 150 in step 1014, thereby actuating a blocking member to open or unlock the entry point. Skilled persons will appreciate that comparing received authentication information with authentication information stored in memory sites of electronic locking device 100 is but one method of authenticating access and other known methods and techniques of authenticating access may have utility in various embodiments. If received authentication information does not authorize access in step 1012, the method may return to step 1002 where the user can again request authentication information from access control server 460, if desired. Skilled persons will further appreciate that electronic locking device 100 and optical signal generator 404 can be configured to alert the user if access is authorized or denied. For instance, electronic locking device 100 can emit a visual signal via an LED or an audible signal via beeper 136.

Figure 11:
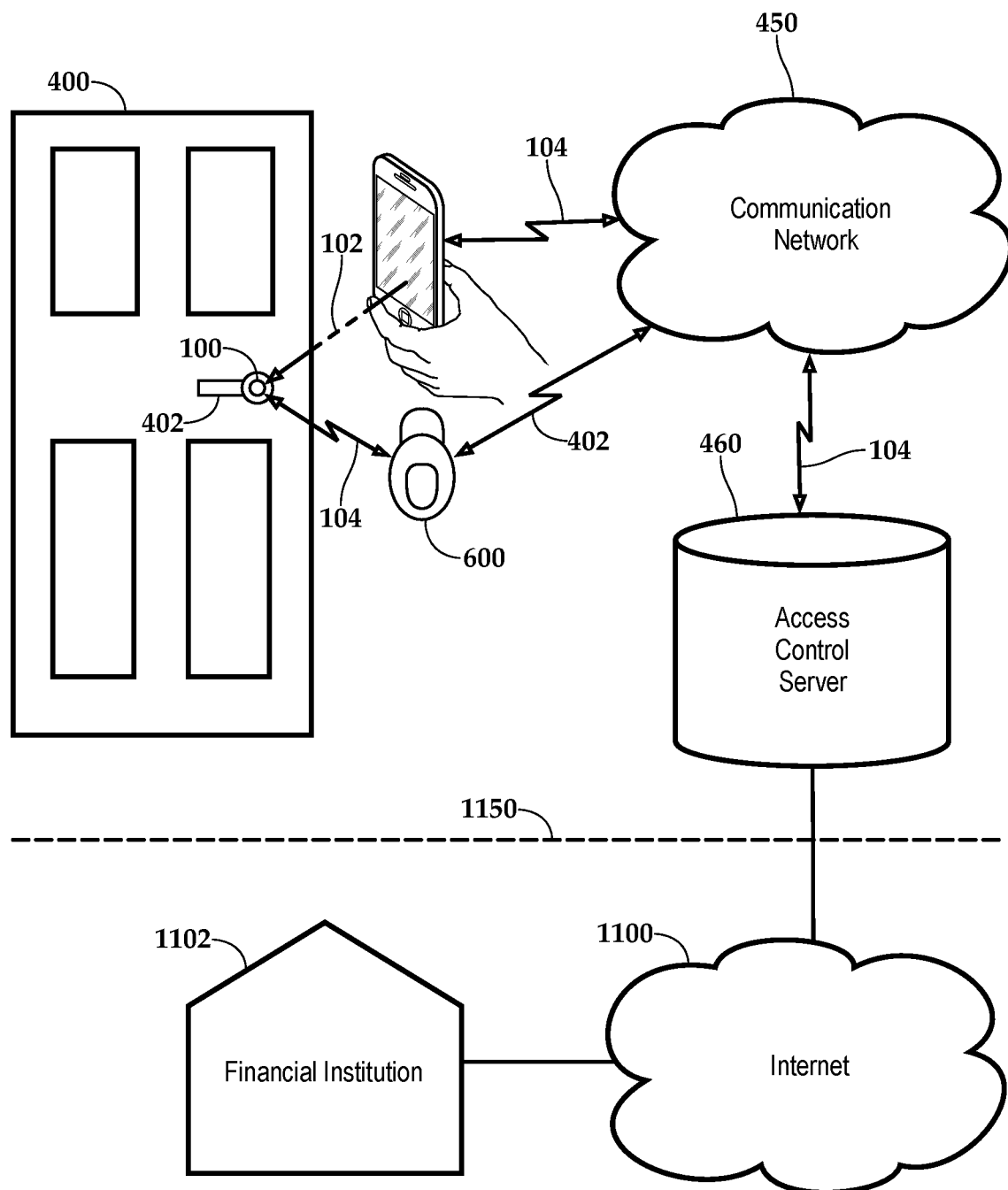
FIG. 11 is a block diagram illustrating example wireless communications between an electronic locking device, an optical signal generator, an administration badge, and an access control server, and further illustrating example communications between the access control server and a financial institution located remotely from the access control system.

Referring now to FIG. 11, access control server 460 can be configured to exchange information with electronic devices located remotely from the access control system. In FIG. 11, system boundary 1150 denotes a separation between elements located within the access control system (depicted above system boundary 1150) and elements located remotely from the system (depicted below system boundary 1150). For example, devices located remotely from the system may be in another building or even another city. To illustrate, electronic locking device 100 can be installed on door handle 402 (associated with door 400). Optical signal generator 404 and administration badge 600 can each be configured to communicate with electronic locking device 100, as described elsewhere in this disclosure. Additionally, optical signal generator 404 and administration badge 600 can each be configured to communicate with access control server 460, for instance via BWC interface 104 by way of communication network 450 (e.g. WLAN or WWAN). In accordance with various embodiments, at least one of optical signal generator 404 and administration badge 600 can communicate with access control server 460 to transmit or exchange access control information. In this example, access control information may comprise information associated with access events involving at least one of electronic locking device 100, optical signal generator 404, and administration badge 600. Access control server 460 can also be configured to communicate with a remote electronic device. For example, if access control server 460 is connected (via wired or wireless link) to Internet 1100, access control server 460 can be configured to communicate with a remote electronic device also connected to Internet 1100. In accordance with various embodiments, access control server 460 can communicate with an electronic device located at a financial institution 1102. It will be understood that financial institution 1102 can be any business conducting financial transactions, such as a bank, credit union, e-commerce business such as PayPal®, or insurance company. In this example, access control server 460 can communicate with an electronic device (e.g. server) at financial institution 1102 to authorize an electronic funds transfer (EFT) or other form of payment on behalf of a customer or member of financial institution 1102.

In accordance with at least some embodiments, users of electronic locking device 100 can be charged a monetary fee associated with use of the device, the amount of the fee being based, in part, on device usage information. In some implementations, device usage information is calculated using access control information stored in memory sites of at least one of electronic locking device 100, optical signal generator 404, access control server 460, and administration badge 600. In this context, the term usage information means information associated with operation of, or communication with, electronic locking device 100, such as the amount of time elapsed between openings, the time and date that electronic locking device 100 was first accessed by a particular user, or the number of openings in a predetermined period of time, to identify just a few examples. In some implementations, usage information is used to determine a monetary fee associated with use of electronic locking device 100. For instance, electronic locking device 100 can be arranged to restrict access to an area or item. The owner of the area or item may wish to charge others for use of or access to the area or item. Access control information written to memory sites of electronic locking device 100, optical signal generator 404, administration badge 600, and/or access control server 460 can be used to calculate a value or fee associated with use of the locking device. Thereafter, a user of the system can be charged, based at least in part on the calculated value or fee, for use of or access to the area or item secured by electronic locking device 100.

To illustrate, in some implementations it is desired to charge a user based on the period of time that an item or area is accessible to the user. The duration that an item or area is accessible can be calculated using information associated with access events, such as information associated with an unlocking event initiated by electronic locking device 100 that is recorded in memory sites of electronic locking device 100 or optical signal generator 404. A user wishing to operate electronic locking device 100 to unlock an entry point and gain access to an area or item can initiate transmission of authentication information via wireless optical signal 102, for instance by utilizing optical signal generator 404. Optical signal generator 404 can be configured to write, to memory sites, information associated with transmission of wireless optical signal 102, such as the time and date that the signal was transmitted. In this manner, optical signal generator 404 can create a record of the precise moment that the user attempted to operate electronic locking device 100 to unlock the entry point. Electronic locking device 100 can also record information associated with the access event, such as the time and date when authentication information was received via wireless optical signal 102, or the time and date when electronic locking device 100 was opened. If the user of optical signal generator 404 successfully transmits valid authentication information to electronic locking device 100, the user can thereafter operate the locking device to unlock the entry point and access the area or item.

In accordance with various embodiments, electronic locking device 100 can be configured such that authentication information is utilized not only to unlock the entry point, but also to lock or secure the entry point. In such implementations, once the user is finished accessing the area or item secured by electronic locking device 100, the user again transmits information to electronic locking device 100 via wireless optical signal 102. As with the unlocking procedure for electronic locking device 100, optical signal generator 404 can be configured to write, to memory sites, information associated with transmission of authentication information during the locking process, such as the time and date that the signal was transmitted. In this manner, optical signal generator 404 can create a record of access events that includes, in various implementations, the time and date that the user opened electronic locking device 100 and the time and date thereafter that the user secured electronic locking device 100. Accordingly, the duration during which the user enjoyed access to the item or area secured by electronic locking device 100 can be calculated using at least a portion of the information logged by optical signal generator 404. For instance, if access control information indicates that optical signal generator 404 transmitted authentication information to unlock the entry point at 10:00 am and subsequently transmitted authentication information to lock the entry point at 12:00 pm, the user of the device may be charged for two hours of access to the item or area. In this example, if the owner or administrator establishes a fee of $25.00 per each hour of use, the user of the item or area can be assessed a $50.00 fee for the two hours of use.

In accordance with various embodiments, access control server 460 can be configured to automatically charge a user of electronic locking device 100 based, at least in part, on access control information, such as time and date information associated with access events. To illustrate, optical signal generator 404 can be configured to transmit, via BWC interface 104, access control information to access control server 460. In some implementations, optical signal generator 404 can transmit access control information immediately after an access event, for instance if the administrator of the system wishes to have real-time, or near real-time monitoring of access events. In other implementations, optical signal generator 404 can transmit access control information periodically, such as every five minutes, or every hour. In yet other implementations, optical signal generator 404 transmits access control information automatically when linked to communication network 450 (e.g. a facility Wi-Fi network). If access control server 460 receives, from optical signal generator 404 or another device, access control information associated with a user's opening and securing of a particular electronic locking device 100, access control server 460 can calculate the duration between the opening event and the securing event. Skilled persons will appreciate that using information obtained from optical signal generator 404 is but one method to calculate usage information for a particular user or lock and that access control server 460 can be configured to use information from other devices in the system, such as administration badge 600. In other implementations, access control server 460 can use information generated or recorded by the server itself to calculate usage information, such as records associated with request messages received from, or transmission of authentication information to, optical signal generator 404.

In accordance with at least some embodiments, access control server 460 can calculate a monetary fee based, at least in part, on the duration between an opening event and a securing event associated with electronic locking device 100. In some implementations, access control server 460 can be configured to immediately charge the user. For instance, the user may create and register an account associated with access control server 460 that entails the user providing credit card information (or other appropriate information used to execute electronic payment) prior to receiving authentication information from access control server 460. In this manner, access control server 460 can use credit card or other payment information to automatically charge a monetary fee associated with a user's access to an item or area secured by electronic locking device 100. To illustrate, a user of a parking garage can provide credit card information to access control server 460 in order to receive authentication information for access to the garage. Here, electronic locking device 100 can be operatively associated with a barrier gate or other blocking member restricting access to the parking facility. The user can be charged a fee that is based, at least in part, on the duration between the user's entry into the garage and the user's exit from the garage. Or alternatively, on the number of times the user entered the garage during a specified time period. In this example, the user provides authentication information to actuate the barrier gate for both ingress and egress. Thereafter, access control information associated with the ingress and egress access events can be used to determine the duration of use. Access control server 460 can be configured to contact financial institution 1102 (e.g. via the Internet) to obtain electronic payment in accordance with the user's previously provided payment information. In alternative implementations, access control server 460 can automatically generate an invoice for the user, for example where electronic payment methods are unsuccessful or unavailable. Skilled persons will appreciate that duration of access is but one example of usage information that may be utilized to assess a fee to users and that other information, for instance the number of openings in a predetermined time period, can be utilized depending on the desired operation of the access control system.

Figure 12:
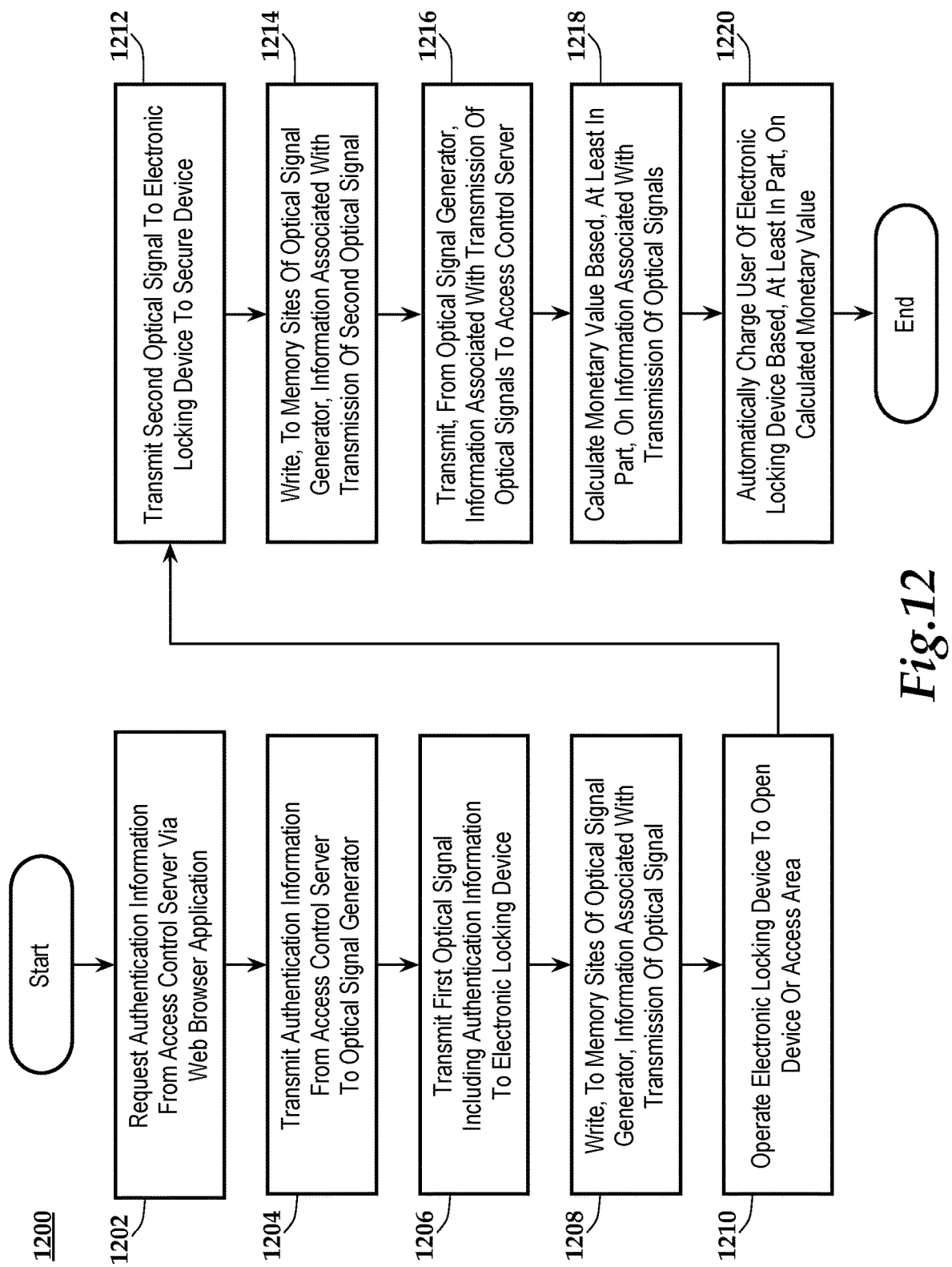
FIG. 12 is a flowchart illustrating an example method of automatically calculating a monetary fee and charging said fee to a user of an access control system, the monetary fee being calculated based, at least in part, on access control information associated with transmission of optical signals to an electronic locking device.

FIG. 12 illustrates an example method 1200 for automatically generating payment information based, at least in part, on use of an electronic locking device. The method 1200 begins at step 1202 where a user, wishing to operate electronic locking device 100, transmits, to access control server 460, a message requesting authentication information, the request message originating from a web browser application executing on optical signal generator 404. In various implementations, access control server 460 can be configured to authenticate the user (e.g. via username, password, ID number, or other credential information) prior to responding to the request message. In yet other implementations, access control server 460 can query the user of optical signal generator 404 to obtain additional information, such as the location of the electronic locking device for which access is requested. It will be appreciated by skilled persons that access control server 460 can utilize other types of information to verify the user's request, such as biometric information measured by optical signal generator 404, time and date information, or GPS information associated with the position of the user, to provide a few examples.

If the user is indeed authorized to obtain authentication information for electronic locking device 100, access control server 460 transmits authentication information associated with the specified device to the user in step 1204. For example, access control server 460 can transmit authentication information to optical signal generator 404 via BWC interface 104. In some implementations, access control server 460 may facilitate delivery of authentication information to optical signal generator 404 by providing the information in a webpage accessible from the web browser application executing on optical signal generator 404. In accordance with at least some implementations, optical signal generator 404 can be configured to transmit a message to access control server 460 to indicate successful receipt of the authentication information.

In step 1206, the user transmits the authentication information to electronic locking device 100 via wireless optical signal 102 (generated by optical signal device 404). In various implementations, optical signal generator 404 can be configured to generate wireless optical signal 102 automatically upon receipt of authentication information from access control server 460. In some implementations, optical signal generator 404 can transmit authentication information via VLC methods, such as by causing a light source for a display screen of optical signal generator 404 to emit visible light at a certain frequency, pattern, or intensity. To illustrate, upon receipt of authentication information from access control server 460, optical signal generator 404 can be configured to automatically display, via an associated display screen, a static visual feature such as a static image or other fixed two-dimensional pattern, or a dynamic visual feature, such as a video (e.g. AVI file, FLV file, MP4 file, etc.) or animation (e.g. GIF file), such that a light source associated with the display screen emits a visible optical signal that conveys at least a portion of the authentication information. It will be understood that a static visual feature refers to visual content displayed on the screen that remains substantially unchanged for the duration of presentation necessary to convey the authentication information. Likewise, a dynamic visual feature refers to visual content that substantially changes at least once during the duration of presentation necessary to convey the authentication information. Skilled persons will appreciate that a dynamic visual feature may change in a manner that is not perceptible to the human eye but may otherwise be detectable by hardware such as photodetector 130.

In some implementations, access control server 460 can be configured to serve a webpage including the appropriate static visual feature or dynamic visual feature such that viewing the webpage on optical signal generator 404 causes presentation, on the display screen, of VLC signals conveying the authentication information. Optical signal generator 404 can be configured to continuously transmit authentication information (e.g. in repeating cycles) until interrupted by the user, for instance by exiting the web browser application or other software application causing presentation of wireless optical signal 102, or by otherwise interrupting generation of the VLC signals. In other implementations, the authentication information can be presented on the display screen (or via another light source) for a predetermined period of time or, for example where the visual element is a dynamic visual feature, for a predetermined number of cycles. Skilled persons will appreciate that VLC methods utilizing a light source associated with a display screen of optical signal generator 404 is but one method of transmitting information and other methods may be used to implement wireless optical signal 102. In alternative implementations, wireless optical signal 102 may be implemented using other sources of visible light, such as using one or more LEDs operatively associated with optical signal generator 404. For instance, wireless optical signal 102 can be implemented with a camera flash or via another LED or light source of optical signal generator 404. Here, the camera flash can comprise an LED that is configured to present authentication information by flashing visible light pulses in a pattern or at a certain frequency or intensity. In some implementations, the camera flash or other LED can modulate the color of the visible light emitted in a particular pattern. In yet other implementations, wireless optical signal 102 can be implemented using non-visible optical signals, for instance via components of optical signal generator 404 configured to produce IRC signals or UVC signals.

In step 1208, optical signal generator 404 writes access event information to memory sites associated with the optical signal generator. For instance, upon transmission of authentication information, optical signal generator 404 can record information associated with the transmission of authentication information, such as the date and time that transmission was initiated. In some implementations, optical signal generator 404 can record additional information associated with the transmission, such as the GPS location of optical signal generator 404 at the time of transmission. If valid authentication information is transmitted to electronic locking device 100 in step 1208, the user can operate (e.g. open) electronic locking device 100 in step 1210. Here, electronic locking device 100 can also be configured to write access event information to memory sites associated with the locking device, such as the time and date that authentication information was received via wireless optical signal 102. In step 1212, the user again transmits authentication information to electronic locking device 100 to operate (e.g. lock or otherwise secure) the device. In some implementations, the user can transmit the same authentication information transmitted in step 1206. Here, the user can initiate transmission using optical signal generator 404, for example by using the same display pattern utilized in step 1206, or by again requesting authentication information from access control server 460. In other implementations, the information used to lock or secure the device can be a generic locking code, wherein the same authentication information is used to secure multiple locking devices deployed in the system. In step 1214, optical signal generator 404 writes access event information associated with the second transmission of authentication information (e.g. to lock or secure the device) to memory sites associated with the optical signal generator. The information recorded by optical signal generator 404 in this step 1214 may be the same type or category of information recorded in step 1208 (e.g. date and time of transmission). Electronic locking device 100 can also be configured to write event information to memory sites associated with the locking device, such as the time and date the locking device was secured by the user.

Next, access event information is transmitted to access control server 460 in step 1216. To illustrate, in accordance with at least some embodiments, optical signal generator 404 can be configured to automatically transmit access event information to access control server 460 immediately after writing such information to memory sites (i.e. immediately following completion of step 1214). Optical signal generator 404 may be configured to transmit access event information via BWC interface 104. In some implementations, BWC interface 104 is established between optical signal generator 404 and access control server 460 using a cellular data network protocol or other standard wireless communication protocol. In other implementations, optical signal generator 404 can attempt transmission of access event information at predetermined intervals, such as every hour after an access event. In yet other implementations, access event information can be retrieved from electronic locking device 100 and thereafter transmitted to access control server 460. For instance, administration badge 600 can retrieve access event information from electronic locking device 100. Thereafter, administrative badge 600 can be configured to automatically transmit access event information to access control server 460 (e.g. via BWC interface 104). Alternatively, administration badge 600 can be configured to transmit access event information to system monitor 700 where it is then transmitted to access control server 460.

In step 1218, access control server 460 calculates a monetary value associated with use of electronic locking device 100, the monetary value being calculated based, at least in part, on the access event information received in step 1216. In some implementations, access control server 460 can be configured to use access event information generated by the server to calculate the monetary value, for instance information written to memory sites contemporaneously with transmission of authentication information from the server to optical signal generator 404. To illustrate, access event information may indicate that a user of the system accessed a particular electronic locking device at 1:00 pm and thereafter secured the locking device at 5:00 pm on the same day. In this particular example, the value assigned for access to the area or item secured by the locking device is $10.00 per hour. Based, at least in part, on the access event information indicating the time the user accessed (and later secured) electronic locking device 100, access control server 460 may calculate a monetary value of $40.00 for the four hours of access to the area or item secured by the locking device. In another example, access event information may indicate that a user accessed a particular locking device three times during a 24-hour period. Here, the value of using the locking device is $10.00 per use (or opening). In this example, access control server 460 can calculate a monetary value of $30.00 associated with use of the locking device (i.e. $10.00 for each of the 3 openings). Skilled persons will appreciate that access control server 460 can be configured to calculate monetary value based on other information, for example the number of openings per month, the duration between openings, or a combination of metrics (e.g. duration of use and an additional flat fee per use).

Lastly, in step 1220, access control server 460 automatically charges the user based, at least in part, on the monetary value calculated in step 1218. For example, if access control server 460 calculated a monetary value of $30.00 in step 1218, it can be configured to automatically charge the user $30.00. Alternatively, it may charge an additional fee, such as a use fee. For instance, if the monetary value calculated in step 1218 was $30.00, access control server 460 can assess an additional service fee (or similar charge) of $2.50 for a total charge to the user of $32.50. Depending on the desired operation of the system, access control server 460 can use known electronic methods to charge the user. In this example, a user wishing to access electronic locking device 100 may first register an account and provide credit card information (or other electronic payment information) to be stored by the system, such as in memory sites of access control server 460. Access control server 460 can be configured to use stored electronic payment information to automatically obtain payment, for example by initiating a charge to the user's credit card or bank account (according to known methods). In other implementations, for example where electronic payment technologies are unavailable or unsuccessful, access control server 460 can be configured to generate an invoice or other document designed to request or collect payment from the user. In yet other examples, access control server 460 can apply a charge to an account associated with the user (e.g. if it is desired to extend credit terms to the user). It will be understood that access control server 460 may employ any known methods and technologies for charging users based on the monetary value calculated in step 1218.

While this method is illustrated by way of access control server 460 calculating a value associated with use of electronic locking device (see step 1218 above), and thereafter automatically charging a user of electronic locking device based, at least in part, on the value calculated (see step 1220 above), it will be appreciated that in alternative implementations, such steps may be performed by another device (or combination of devices) deployed in the access control system. For example, optical signal generator 404 may, prior to transmission of access event information (see step 1216 above), calculate a monetary value based, at least in part, on the access event information. Optical signal generator 404 can be configured to transmit, to access control server 460, the access event information and the calculated monetary value. In this example, access control server 460 uses the monetary value calculated by optical signal generator 404 to charge users. In some implementations, such steps may be performed by administrative badge 600. For instance, if it is desired to use access event information from memory sites of electronic locking device 100, a system administrator can retrieve access event information from the locking device using administrative badge 600 (as described above). Administrative badge 600 can be configured to use the retrieved access event information to calculate a monetary value associated with use of electronic locking device 100. If administrative badge 600 is configured such that it can communicate with devices across the Internet (e.g. via a cellular data network), administrative badge 600 can be configured to communicate with a user's financial institute to charge the user's credit card. For instance, administrative badge 600 can communicate with access control server 460, such as by way of communication network 450, to retrieve electronic payment information for a particular user. Administrative badge 600 can then use the retrieved electronic payment information to charge the user's credit card or bank account. Skilled persons will appreciate that these examples are illustrative of various implementations of the method and are not intended to limit the scope of the method steps to any particular device or system arrangement.

In accordance with various embodiments, a system administrator or other user of the system can provide authentication information for an electronic locking device to another user of the system. For instance, a user may have authority to control who accesses a particular electronic locking device, such as where the user has installed the locking device on the user's home or office door. The user possessing authority to control access to the electronic locking device can modify access control permissions for the device by communicating with access control server 460. In various implementations of this disclosure, the user can communicate with access control server 460 using a web browser application or another mobile app software application executing on any electronic device capable of communicating with access control server 460 via the methods and protocols described herein. For instance, a user can utilize a web browser application executing on optical signal generator 404. Here, optical signal generator 404 can be implemented as a smart device, such as a commercially available tablet or smartphone that is capable of exchanging access control information with access control server 460, such as via BWC interface 104 and communication network 450.

Figure 13:
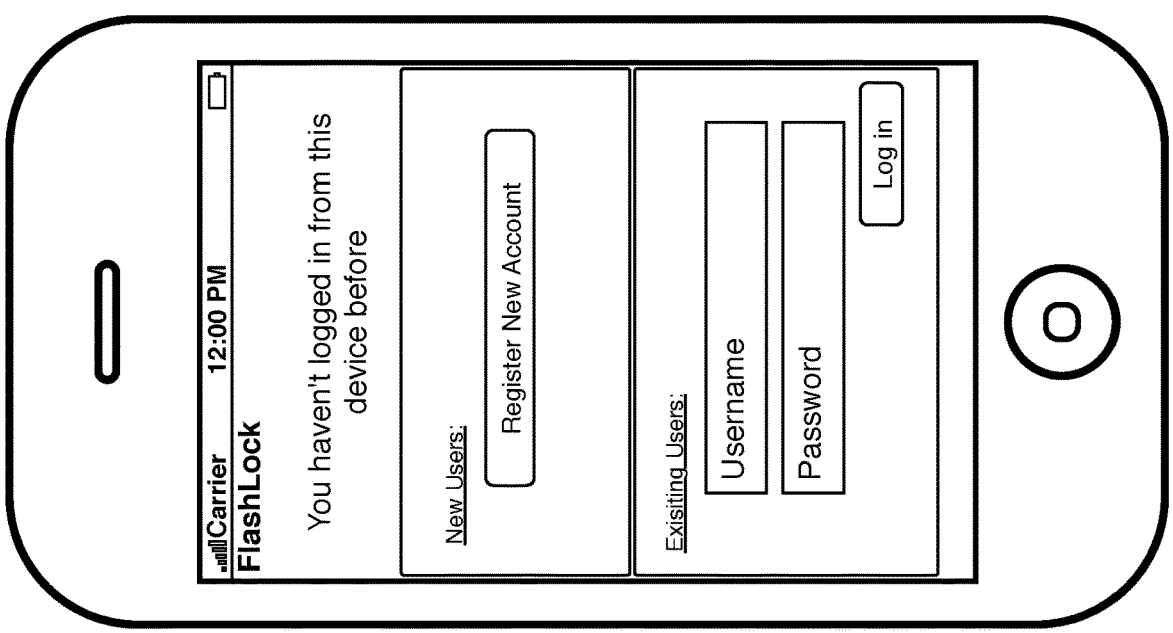
FIG. 13 is a rendering of an optical signal generator comprising a display screen illustrating an example graphical user interface wherein access control information associated with a user login is displayed on the screen.

Turning now to FIG. 13, access control information can be displayed via a webpage accessible from a web browser application. In the example illustrated by FIG. 13, a user can provide access credentials to access control server 460 in order to view and modify access control information. In this example, the user is prompted to provide a username and password prior to accessing the information. Upon providing valid access credentials, access control server 460 can be configured to provide the user with access control information associated with all locking devices that the user may open. It will be appreciated that other methods of authenticating the user can be employed depending on the desired operation of the access control system. For instance, in some implementations, communication network 450 can comprise an internal intranet, nullifying many of the security concerns associated with transmitting information via a publically accessible Internet. The system may even be configured such that it does not require an access credential to be submitted by the user. Skilled persons will understand that desired security safeguards of a particular access control system may dictate variations in the authentication process used to grant access to view and modify access control information.

Figure 14:
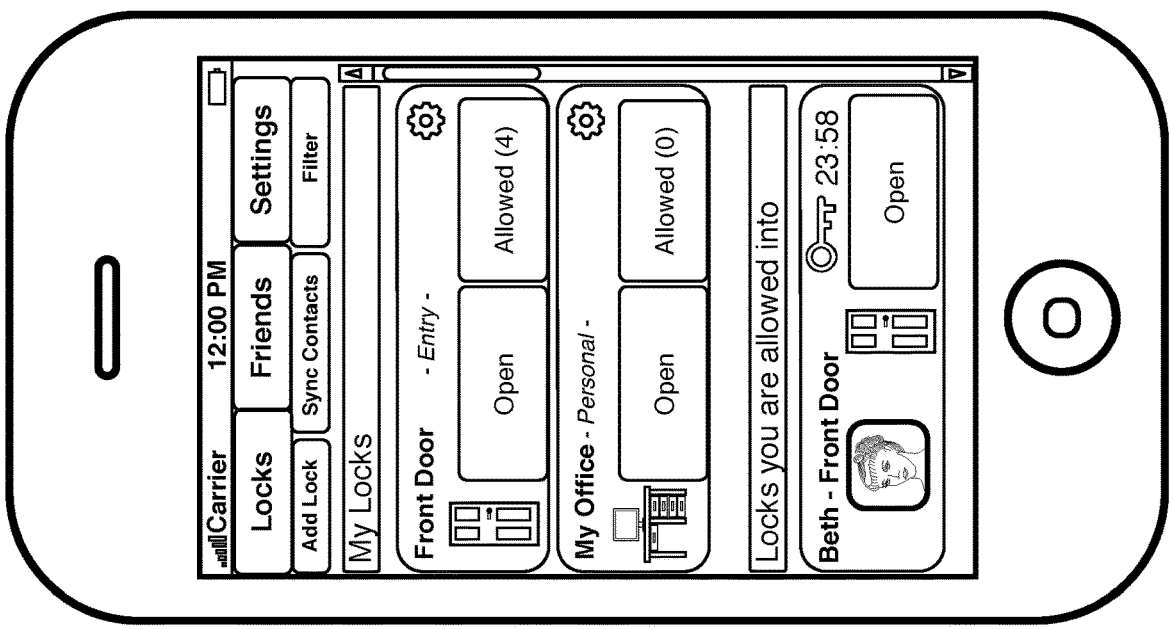
FIG. 14 is a rendering of an optical signal generator comprising a display screen illustrating an example graphical user interface wherein access control information associated with a user is displayed on the screen.

FIG. 14 illustrates one example of a user interface for displaying access control information to the user, via a webpage accessible from a web browser application. To provide additional context to the user, electronic locking device 100 can be associated with identifying information. For instance, in FIG. 14 a particular electronic locking device 100 is labeled "Front Door," allowing the user to quickly identify where that particular locking device is installed within the access control system, or which item or area it is intended to secure. In accordance with various implementations, locking devices that the user has permission to open are further differentiated by the degree of control that the user may exert over the locking device. For example, the locking devices labeled "Front Door" and "My Office" in FIG. 14 are installed on entry points owned or administered by the user. However, the locking device labeled "Beth—Front Door" is installed on an entry point owned or administered by another individual in the access control system. In various implementations, access control server 460 can be configured to permit the user to modify access control permissions for locking devices owned or administered by the user. For locking devices in the access control system that are owned or administered by other individuals, access control server 460 can be configured such that the user has permission to view, but not modify, the access permissions. As illustrated in FIG. 14, the locking devices owned or administered by the user can be, for convenience, listed separately from locking devices owned or administered by other individuals in the system. In this example, the locking devices owned or administered by the user are labeled "My Locks," whereas the locking devices owned or administered by other users are labeled "Locks you are allowed into."

Figure 15:
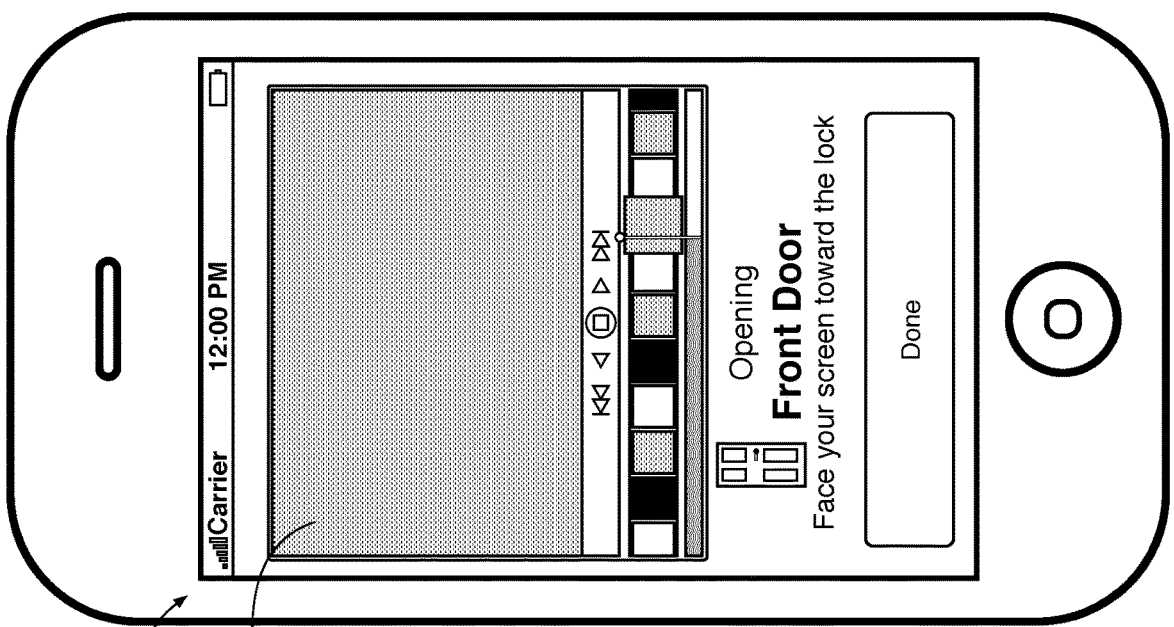
FIG. 15 is a rendering of an optical signal generator comprising a display screen illustrating an example graphical user interface wherein authentication information associated with an electronic locking device is presented as a dynamic image displayed on the screen.

As further illustrated by FIG. 14, the user can access any of the listed locks by selecting, in the webpage, the button labeled "Open," for example by pressing the appropriate location on a touch-sensitive display screen associated with optical signal generator 404. If the user wishes to open a locking device, access control server 460 can be configured to cause delivery of authentication information to optical signal generator 404 by way of the webpage. To illustrate, if the user wishes to open the locking device labeled "Front Door," the user can select the appropriate "Open" button. Access control device 460 can be configured to respond to selection of the "Open" button by generating, within the webpage or by redirecting to a new webpage, a display pattern configured to generate a VLC optical signal conveying authentication information for the selected locking device. For instance, FIG. 15 illustrates an example user access interface 1500 depicting presentation, within a webpage, of an example dynamic visual code 1510 that causes wireless optical signal 102 (generated in this example by a light source associated with the display screen) to convey authentication information. Here, access control server 460 is configured to provide, for display on a web browser, a webpage including an animation or video. In this illustration, dynamic visual code 1510 is a dynamic visual feature that includes a plurality of substantially different colored regions that are displayed in succession during presentation of the animation or video. Although FIG. 15 depicts dynamic visual code 1510 as a video or animation comprising a series of black, white, and off-colored regions, it will be understood by skilled persons that dynamic visual code 1510 can be implemented using other dynamic or static visual content, such as different colored regions or shapes, a photograph, or even a clip of a published film or video, such as a video uploaded to the YouTube video community. In this implementation, access control server 460 can cause optical signal generator 404 to present the authentication information as wireless optical signal 102 by displaying on a screen of the optical signal generator, the visual content of the webpage or by otherwise providing information to optical signal generator to cause display of the visual content on the display screen.

To illustrate further, access control server 460 can serve a webpage that includes a dynamic visual feature that alternates between displaying the different colored rectangles depicted in FIG. 15. In this example, the intensity of light in the visual light wavelength spectrum (generated by a light source associated with the display screen) is greater during display of the white rectangle than during display of the off-colored rectangle or the black rectangle. Access control server 460, by causing the alternating display of these rectangles of varying hue, such as by an animation or video, causes the display screen to emit VLC signals in the form of optical pulses (e.g. pulses of varying intensity). Photodetector 130 can, for example, measure the intensity (e.g. lux) of the pulses and convert (e.g. sampling the optical signals to perform analog-to-digital conversion) the optical signal into a corresponding electrical signal. In this manner, VLC signals generated by a light source associated with the display screen can, according to the pattern of the visual content of the webpage, transmit information serially (i.e. one bit at a time) to photodetector 130.

To illustrate one example, ternary (or binary if desired) information, such as an access code comprising a ternary number sequence, can be transmitted by modulating a light source associated with the display screen. In accordance with various implementations, dynamic visual code 1510 can be configured to modulate the light source associated with the screen in a manner generating three distinct states in the resulting optical signal. Here, the highest intensity (i.e. the white rectangle) can correspond to logic level 2, the off-colored rectangle can correspond to logic level 1, and the lowest intensity (i.e. the darker, black rectangle) can correspond to logic level 0. The pattern, duration, or frequency according to which the white, off-color, and black rectangles are alternately displayed will depend, at least in part, on the ternary information to be transmitted. Photodetector 130 can be configured to convert the optical pulses of varying intensities of visual light back into ternary information, for example according to changes in measured illuminance. Photodetector 130 can then provide the ternary information to microprocessor 112, for example to initiate an access event such as the unlocking of an entry point. Ternary information is but one example of information that can be transmitted via wireless optical signal 102 and skilled person will appreciate that information formatted according to other rules and systems may have utility. It will be further appreciated that alternately displaying regions of different hues on a webpage is but one example of utilizing VLC methods to transmit information via wireless optical signal 102 and that other methods and techniques may have utility depending on the system. For instance, access control server 460 can be configured to serve a webpage including other types of images, such as displaying patterns of images comprising different colored shapes or logos. In yet other implementations, access control server 460 can be configured such that selecting the "Open" button within the webpage causes delivery of a message to optical signal generator 404. For example, access control server 460 may transmit a message including authentication information along with instructions to generate optical signals including the authentication information via an LED or other optical device associated with optical signal generator 404, such as a device capable of generating an IRC or UVC signal.

Figure 16:
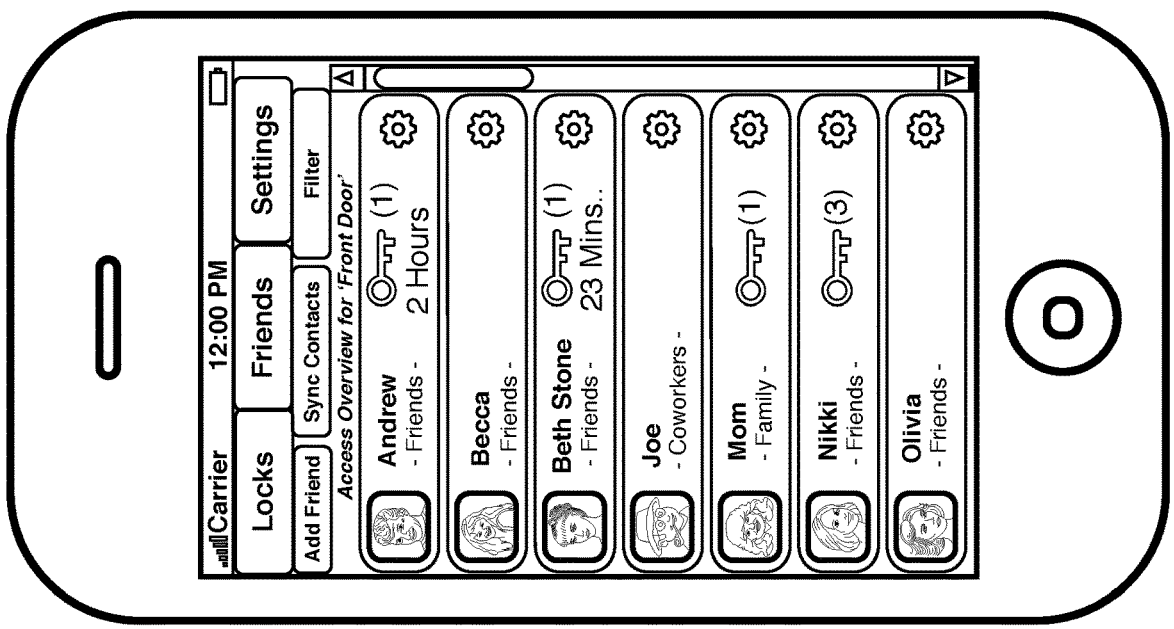
FIG. 16 is a rendering of an optical signal generator comprising a display screen illustrating an example graphical user interface wherein access control information associated with an electronic locking device is displayed on the screen.

Referring again to FIG. 14, in accordance with at least some embodiments a user can modify access permissions for certain locking devices that the user owns or administers by selecting, in the webpage, the button labeled "Allowed." For instance, if the user wishes to modify access permissions for the locking device labeled "Front Door," the user can select the appropriate "Allowed" button (i.e. the "Allowed" button proximate to the "Front Door" label) to view information associated with that particular locking device. As described in this disclosure, access control server 460 can be configured to display information associated with "Front Door" via a webpage accessible from a web browser application, such as a browser application executing on optical signal generator 404. Turning to FIG. 16, an access control server 460 can provide a webpage including information associated with the locking device labeled "Front Door," such as a list of individuals that presently have permission to open that particular locking device. In some implementations, access control server 460 can also provide, via the webpage, a list of other individuals known or registered in the system. To illustrate, FIG. 16 depicts a list of individuals registered in the system. However, the individuals that presently have authorization to open the "Front Door" locking device are visibly distinguished from individuals who do not presently have such authorization. Here, individuals with authorization to open "Front Door" are distinguished visually with a symbol; in this case, the symbol resembles a generic mechanical key. It will be appreciated that other appropriate means for distinguishing between individuals may be utilized, for instance logos, colors, or labels. In various implementations, access control server 460 can be configured to present additional information in the webpage, such as the number of times that an individual is permitted to access a device, or the duration or scheduled times that an individual's access permissions are valid.

Figure 17:
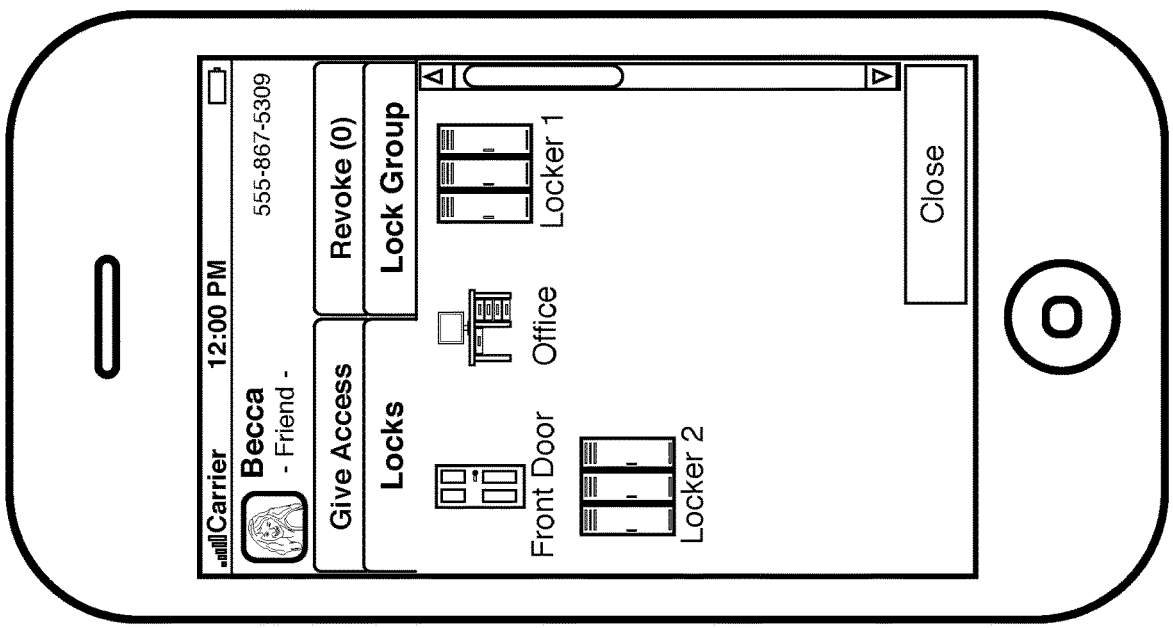
FIG. 17 is a rendering of a smart device comprising a display screen illustrating an example graphical user interface wherein access control information associated with locking devices assigned to a user is displayed on the screen.

In accordance with at least some embodiments, a user can modify access permissions for a particular locking device, for example to provide another individual with access to the device. Referring still to FIG. 16, a user may wish to modify access permissions for "Front Door" to provide access permissions for the individual labeled "Becca." Here, the user can initiate modification of access permissions associated with "Front Door" by selecting the individual labeled "Becca." Skilled persons will appreciate that displaying a list of individuals associated with a particular locking device is but one example of various appropriate methods of presenting and modifying access control information associated with the system. In this example, access control server 460 can be configured to display, in response to a user's selection of the individual labeled "Becca," access permission information that may be associated with Becca. For example, turning now to FIG. 17, access control server 460 can be configured to permit the user to specify how access permissions are modified, for example via text fields or selection menus. As illustrated in FIG. 17, access control server 460 can be configured to respond to the user's selection of Becca by providing (i.e. serving) a webpage that displays options for issuing access permissions to Becca. The user may be provided with an option to issue access permissions to a specific locking device owned or administered by the user. In this example, the user can select between various locking devices labeled "Front Door," "Office," "Locker 1," and "Locker 2." It will be appreciated that FIG. 17 depicts only one example of access control information associated with a user and that other information may have utility depending on the desired operation of the system.

Figure 18:
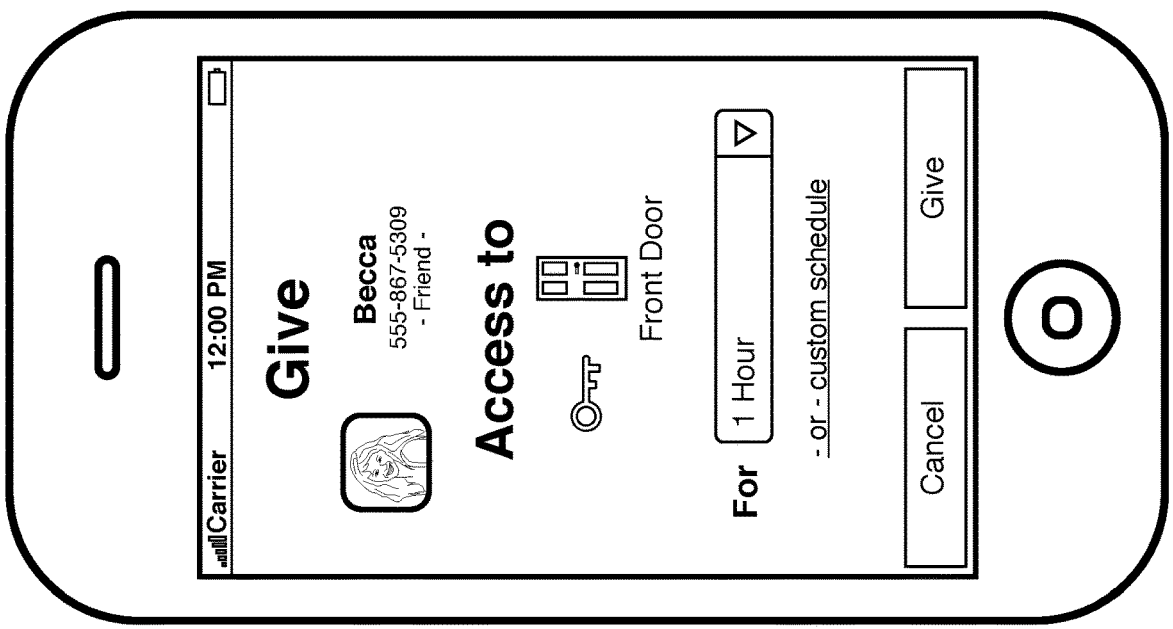
FIG. 18 is a rendering of an optical signal generator comprising a display screen illustrating an example graphical user interface wherein access control information associated with a user's current access permissions is displayed on the screen.
Figure 19:
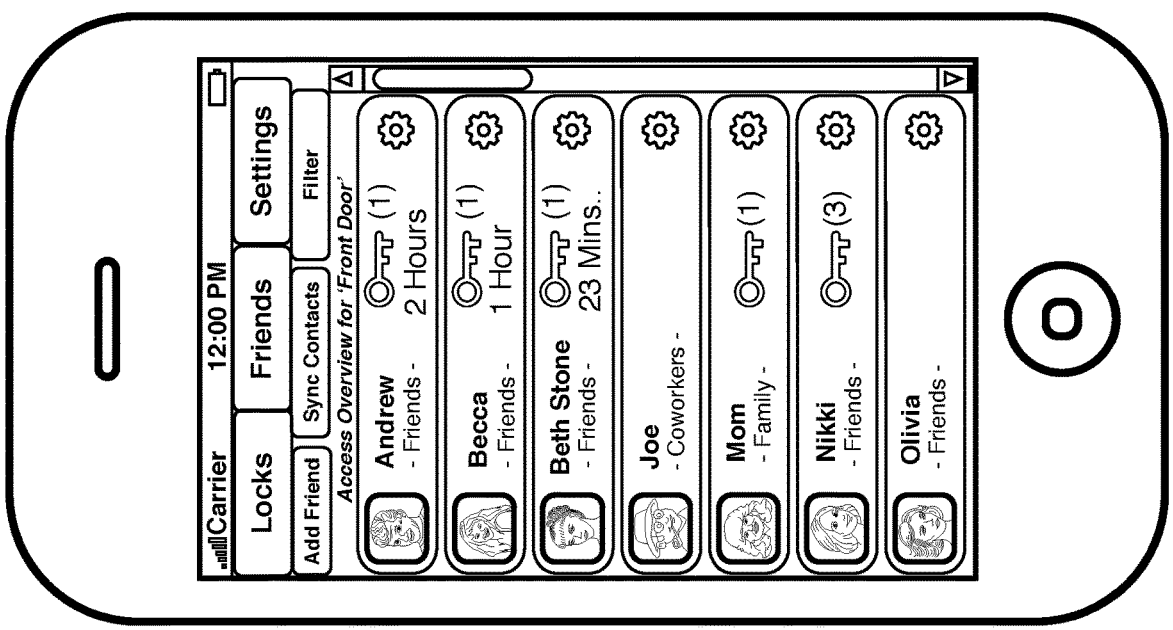
FIG. 19 is a rendering of an optical signal generator comprising a display screen illustrating an example graphical user interface wherein access control information associated with an electronic locking device is displayed on the screen.

Access control server 460 can be configured to permit the user to issue or modify access permissions to a particular locking device. For instance, the user can select the "Front Door" device to provide Becca with authorization to open the locking device labeled "Front Door." Upon selecting the Front Door device, access control server 460 can be configured to allow the user to further modify or specify the access permissions. For example, as illustrated in FIG. 18, the user can select, via the drop down menu, a period of time during which Becca's permissions are valid. Skilled persons will appreciate that the access control information depicted in FIG. 18 is illustrative in nature and that other information may be displayed and modified by the user. In some implementations the user can provide access to a device on certain days of the week, or in response to the occurrence of an event, such as the receipt of payment from a user. By selecting the "Give" button (as depicted in FIG. 18), the user can provide access permissions to Becca based on the user's input, thereby modifying the access permissions associated with the Front Door locking device and with Becca. Upon providing access permissions to Becca, access control server 460 can now indicate (via any appropriate visual method) that Becca has permission to open the Front Door device for one hour, as illustrated in FIG. 19.

It will be understood that, depending on the desired operation of the system, access control server 460 may perform various tasks to update access permissions for a locking device. In the current example, a user of the system requests authentication information from access control server 460, for example via a webpage, prior to operating a locking device. In this implementation, access control server 460 can simply update access control information stored on memory sites of access control server 460 or memory sites associated with the server. To illustrate further, access control server 460 can maintain, in memory sites thereof, a list of individuals that are permitted to open a particular electronic locking device. If an individual is granted permission to open the locking device, access control server 460 may add the name of the individual (or other identifying information) to the list. Thereafter, when the user requests authentication information for the locking device, access control server 460 can be configured to verify that the individual has permission (e.g. by checking the list of individuals in memory sites) prior to delivering authentication information. This is but one example illustrating modification of access permissions and is not intended to limit the scope of this disclosure to any particular method.

Figure 20:
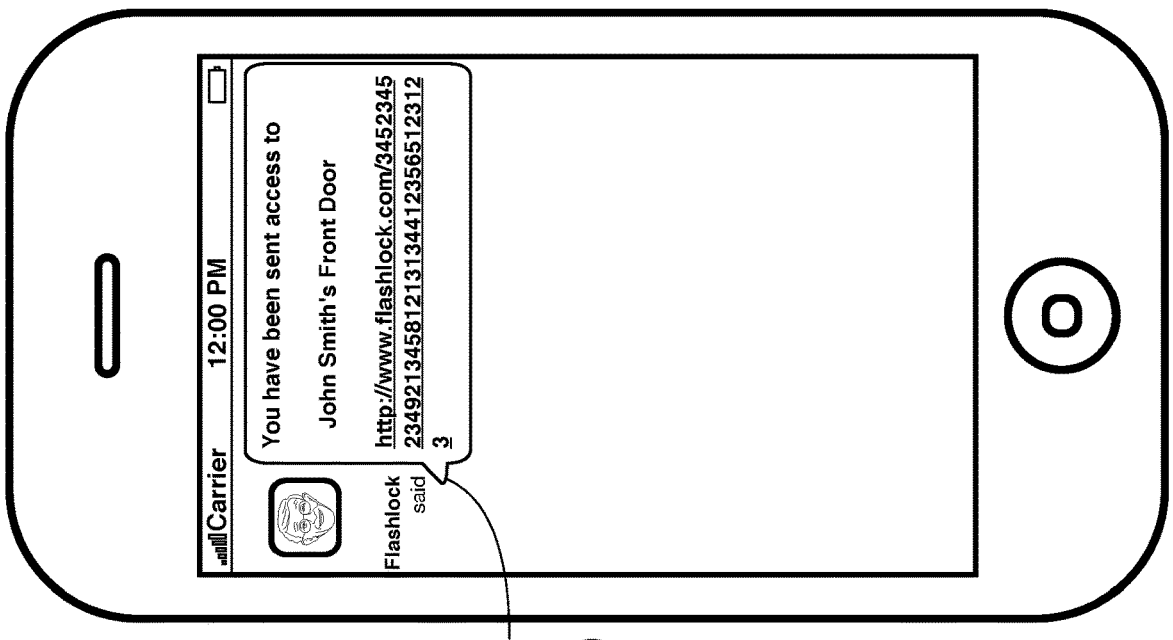
FIG. 20 is a rendering of an optical signal generator comprising a display screen illustrating an example graphical user interface wherein access control information associated with an electronic locking device is included in a short message service text message displayed on the screen.

During the period of time that Becca's access permissions are valid, Becca can access a webpage (e.g. from a web browser application) to open the Front Door locking device. For instance, Becca can login to a secure website to communicate with access control server 460 (as described above with reference to FIG. 13) and select an "Open" button associated with the Front Door device (as described above with reference to FIG. 14 and FIG. 15). In various implementations, Becca can receive an electronic message comprising instructions for opening the Front Door device. To illustrate, Becca can receive an email message via optical communication device 404 containing a link or other instructions that cause optical signal generator 404 to transmit authentication information for the Front Door device. To provide yet another example, Becca can receive, at optical signal generator 404, a short message service (SMS) text message containing a reference to a webpage. A reference to a webpage can be any information permitting a computing device (e.g. smart device) to navigate to the webpage, including a uniform resource locator (URL) hyperlink or other information associated with a resource hosted on the Internet. Turning now to FIG. 20, an access notification message 2000 can include additional information to provide context for the reference to the website. Here, access notification message 2000 is an SMS text message and the reference to the website is a URL hyperlink. In the example depicted by FIG. 20, an SMS text message accessed via optical signal generator 404 includes contextual information that suggests the transmitted URL hyperlink provides access to "John Smith's Front Door." While a URL hyperlink is included in the message depicted in FIG. 20, it will be understood that such a message may contain information in other formats. As an example, the message delivered to Becca can be a multimedia message service (MMS) message comprising an animation or video that, when viewed, presents authentication information as VLC signals generated by a display screen associated with optical signal generator 404.

Figure 21:
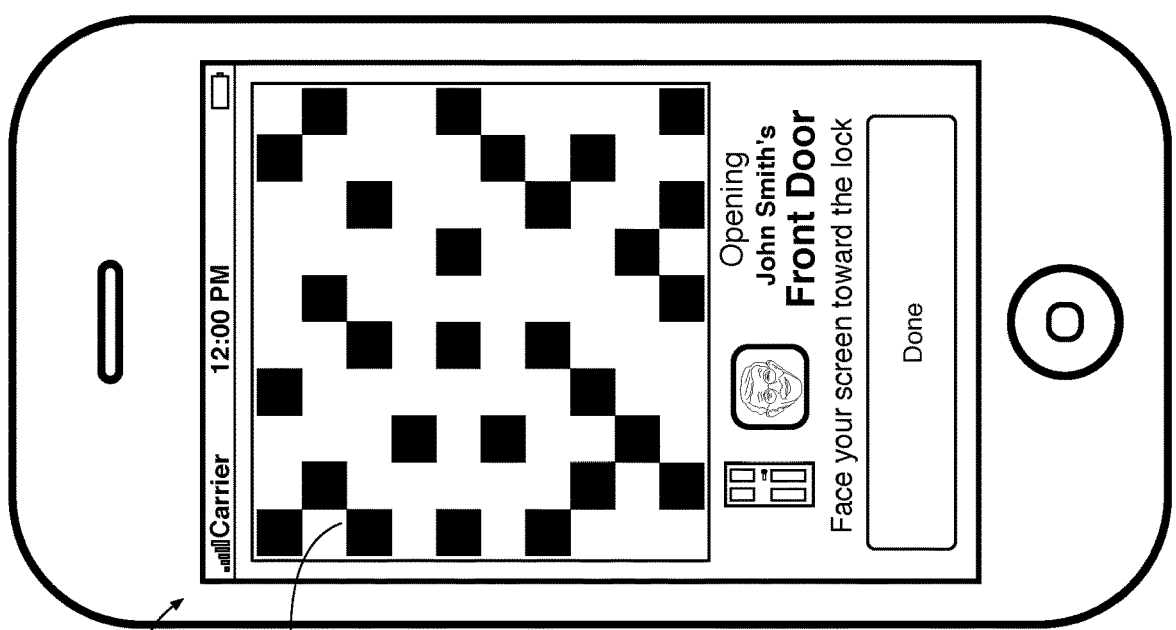
FIG. 21 is a rendering of an optical signal generator comprising a display screen illustrating an example graphical user interface wherein authentication information associated with an electronic locking device is presented as a static image displayed on the screen.

The URL hyperlink depicted in FIG. 20 can be selected (or input by the user directly into a web browser) to thereby cause a web browser application executing on optical signal generator 404 to navigate to a particular web address. Turning to FIG. 21 to illustrate, if the URL hyperlink depicted in FIG. 20 is selected or otherwise input into a web browser application, the browser can display a webpage that includes visual content such as an image or animation that, when displayed on a device, causes a light source associated with a display screen to generate a VLC optical signal conveying at least a portion of the authentication information associated with the electronic locking device identified as "John Smith's Front Door." Here, access control server 460 may provide the webpage automatically if requested by optical signal generator 404. In some implementations, access control server 460 can use an HTTP cookie or other information to identify optical signal generator 404 as the authorized device associated with the URL hyperlink. This HTTP cookie can be placed on optical signal generator 404, for instance in memory associated with the web browser application. Thereafter, any device attempting to access the resource associated with the URL hyperlink (e.g. where the SMS message is forwarded from optical signal generator 404) must provide the HTTP cookie to access control server 460 in order to access the resource. In various implementations, devices that do not provide the HTTP cookie are denied access wherein access control server 460 does not provide the webpage. In this manner, authentication information may only be usable by the user of optical signal generator 404.

In other implementations, access control server 460 may only provide the webpage or other resource associated with the URL hyperlink if the request is received during the time period that access permissions associated with a user of optical signal generator 404 are valid. For example, access control server 460 may identify the user or the device by way of the URL hyperlink information, device information, or user input. To illustrate, in some embodiments access control server 460 is configured to first provide a challenge-response interface requiring the user of optical signal generator 404 to input a response. For example, upon navigating to the URL hyperlink, the user of optical signal generator 404 may provide a username and password, or other credential. Upon authenticating the user, access control server 460 can automatically provide the webpage or, in some implementations, may additionally reference time information to determine if the request is received during a valid access window. For instance, if access permissions associated with the user authorize access to electronic locking device 100 only between the hours of 8:00 am and 5:00 pm, access control server 460 may determine whether the request is received during that time window before providing the webpage. In some implementations, optical signal generator 404 may provide access control server 460 with information identifying the signal generator or the user, such as a media access control (MAC) address or biometric information associated with the user. In accordance with certain implementations, access control server 460 can determine whether to provide the requested webpage in response to at least one of the device information, user information, user input, or time information associated with the request.

The webpage can utilize any suitable method to cause generation of the authentication information. To illustrate, FIG. 21 depicts an example user access interface 2100 depicting presentation, within a webpage, of an example static visual code 2110 that causes wireless optical signal 102 (generated in this example by a light source associated with the display screen) to convey the authentication information associated with the electronic locking device identified as "John Smith's Front Door." It will be appreciated that static visual code 2110 can be any static visual pattern, such as a photograph, a two-dimensional barcode such as a Data Matrix barcode, QR code, or high capacity color barcode (HCCB), to identify just a few examples of static two-dimensional visual content. The two-dimensional pattern depicted in FIG. 21 as static visual code 2110 is but one example of two-dimensional visual content that can be used to present authentication information on the display screen and is not intended to limit the presentation to any particular pattern or color palette. In alternate embodiments, for instance as described elsewhere in this disclosure, the webpage can include an animation or video (or other dynamic image) causing a light source of the display screen to present wireless optical signal 102 as a plurality of regions of varying hues that are alternately displayed to convey the authentication information. It will be appreciated that other methods and techniques of transmitting information via optical signals may be utilized, for instance the webpage can display a movie clip designed to present authentication information as visible light signals generated by the display screen.

Figure 22:
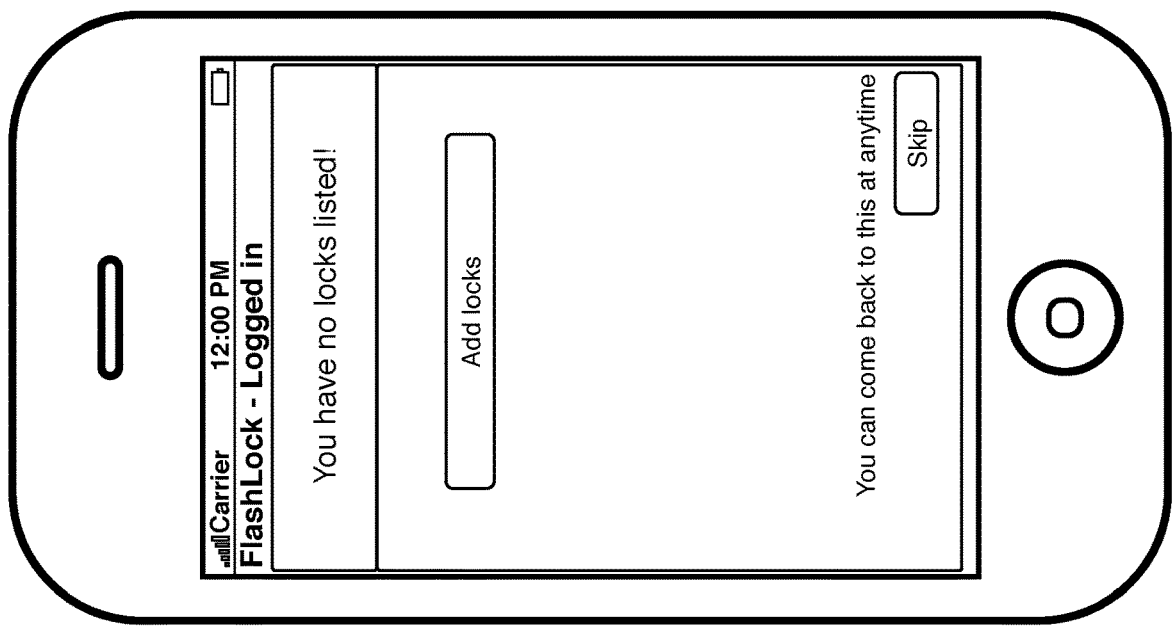
FIG. 22 is a rendering of an optical signal generator comprising a display screen illustrating an example graphical user interface wherein access control information associated with locking devices assigned to a user is displayed on the screen.

While the example provided in this disclosure illustrates modification of access permissions for a particular electronic lock by way of transmitting and/or receiving access control information via signals generated by visual content of a webpage, it will be understood that access control server 460 can be configured to display and modify other information as desired. For instance, electronic locking devices can be added to or registered with an access control system by transmitting information associated with the locking device to access control server 460 via a webpage. Turning to FIG. 22 now, access control server 460 can be configured to determine whether a particular user or administrator of the system is associated with any locking devices, for example by way of having access permissions to a locking device. If access control server 460 determines that the user is not associated with any registered locking devices, access control server 460 can be configured to provide a webpage that displays this information to the user and prompts the user to register new locking devices or identify previously registered locking devices.

Figure 23:
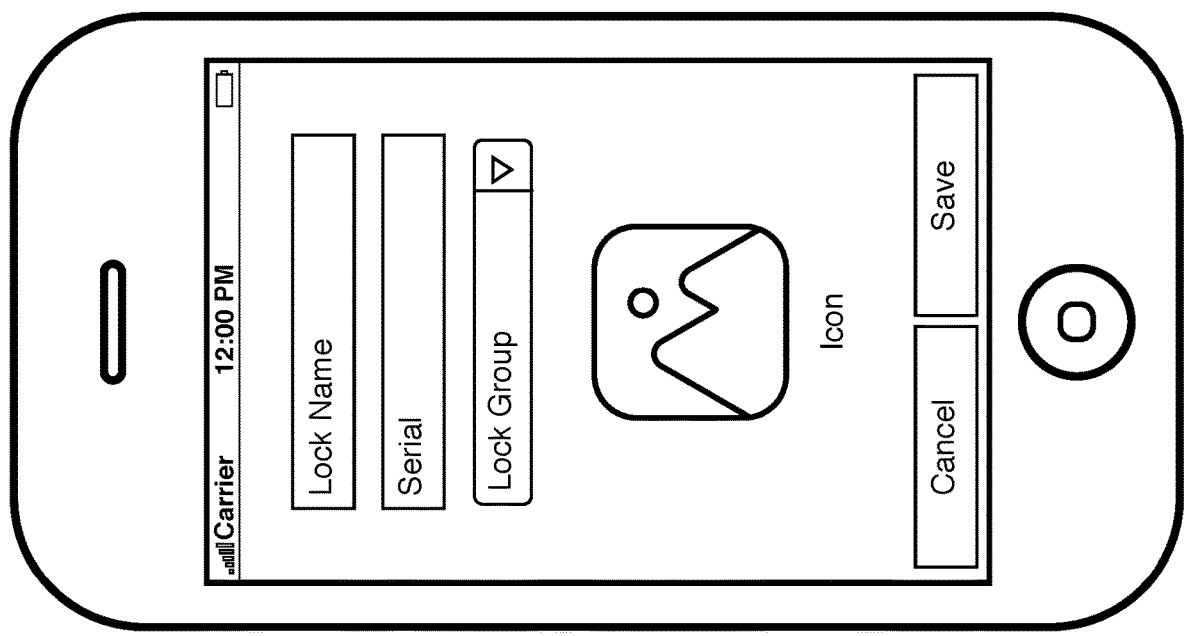
FIG. 23 is a rendering of an optical signal generator comprising a display screen illustrating an example graphical user interface wherein access control information associated with locking devices assigned to a user is displayed on the screen.

To illustrate, as depicted in FIG. 22, a user that is not presently associated with any locking devices or, alternatively, a user who wishes to add additional locking devices can select the button labeled "Add locks" to provide locking device information to the system. In accordance with various embodiments, access control server 460 can prompt the user to input a serial number or other identifying information associated with the locking device. In other implementations, the user can upload information associated with the locking device that is stored in memory sites of electronic devices in communication with access control server 460, for example optical signal generator 404 or administration badge 600. Referring now to FIG. 23, if a user selects the "Add locks" button, access control server 460 can prompt the user, via the webpage interface, for information associated with the locking device, such as a name (e.g. Front Door) and serial number. Skilled persons will appreciate that other information may have utility in the system and that a name and serial number are but one example of information that can be associated with a locking device.

While various implementations are described herein as utilizing a webpage interface to display and exchange information with users of an access control system, persons of skill will appreciate that a webpage is but one example of displaying access control information to the user and other appropriate methods may have utility depending on the characteristics of the system and devices deployed therein. For instance, access control information can be viewed and/or exchanged by utilizing a dedicated software application or other computer program executing on optical signal generator 404, as described above with respect to FIG. 10.

Example Embodiments

The following examples pertain to further embodiments.

Example 1 is an electronic locking device responsive to a light-emitting diode (LED) of a smart device so as to unlock an entry point in response to receiving authentication information conveyed from the LED to the electronic locking device, the electronic locking device comprising: wireless communication circuitry to exchange access control information, the access control information including stored authentication and audit trail information for respectively, updating and reviewing user access of the electronic locking device; a memory for storing the access control information made available to the electronic locking device through the wireless communication circuitry; a photodetector arranged to confront a user holding the smart device so as to receive an optical signal emitted by the LED and produce from it an electrical signal corresponding to the optical signal, the optical and electrical signals each representing the received authentication information; and electrical circuitry that, in response to the electrical signal, determines from it the received authentication information and compares it to the access control information stored in the memory operatively associated with the electrical circuitry so as to unlock the entry point in response to the received authentication information corresponding to the stored authentication information thereby permitting access to the user holding the smart device.

Example 2 includes the electronic locking device of example 1, in which the photodetector is an imager.

Example 3 includes the electronic locking device of example 2, in which the imager is a complementary metal-oxide-semiconductor (CMOS) image sensor or a charge-coupled device (CCD) image sensor.

Example 4 includes the electronic locking device of example 1, in which the entry point is a door or a turnstile.

Example 5 includes the electronic locking device of example 1, in which the optical signal comprises a pattern of flashes emitted by a touchscreen or a camera flash including the LED.

Example 6 includes the electronic locking device of example 1, in which the pattern of flashes includes a start sequence of flashes, and the electrical circuitry, in response to detecting the start sequence, is configured to change its operative state from a low power consumption state to an event initiation state, the low power consumption state characterized by the electrical circuitry forgoing attempts to compare the received authentication information from the electrical signal and the event initiation state characterized by the electrical circuitry attempting to process the received authentication information.

Example 7 includes the electronic locking device of example 1, in which the wireless communication circuitry comprises a wireless networking radio, the wireless networking radio configured to provide wireless personal area network (WPAN) or wireless local area network (WLAN) communications for exchanging the access control information.

Example 8 includes the electronic locking device of example 7, in which the smart device comprises a first smart device, and in which the WPAN communications are received from a second smart device, different from the first smart device, for monitoring the audit trail information.

Example 9 includes the electronic locking device of example 7, in which the WLAN communications are received from a remote administration system.

Example 10 includes the electronic locking device of example 1, in which the optical signal comprises a visual depiction of two-dimensional optical code.

Example 11 includes the electronic locking device of example 10, in which the two-dimensional optical code comprises a Data Matrix code.

Example 12 includes the electronic locking device of any one of examples 1-11, in which the wireless communication circuitry comprises an infrared receiver.

Example 13 includes the electronic locking device of any one of examples 1-11, further comprising: a housing encompassing the photodetector and including sidewalls; and a window recessed from the sidewalls and covering the photodetector so that a display screen of a smart device, when confronting the window and pressed against the sidewalls, suppresses ambient light from reaching the photodetector.

Example 14 is a method, performed by a smart device having a light-emitting diode (LED) and a wireless networking radio, of causing an electronic locking device to unlock an entry point in response to authentication information conveyed from the LED to the electronic locking device, the method comprising: transmitting, from the wireless networking radio to a server, a request to configure the server to provide the authentication information to the smart device acting as a client accessing the server through at least one of a wireless wide area network (WWAN) or a wireless local area network (WLAN); receiving, in response to the request, information that configures the LED to present the authentication information as an optical signal emitted by the LED; and presenting from the LED to a photodetector of the electronic locking device the optical signal that causes the electronic locking device to unlock the entry point.

Example 15 includes the method of example 14, in which the smart device includes a camera flash comprising the LED.

Example 16 includes the method of example 14, in which the smart device includes a user interface display comprising the LED.

Example 17 includes the method of example 16, in which the user interface display is an organic LED (OLED) display comprising the LED.

Example 18 includes the method of example 16, in which the presenting comprises rendering a webpage including a dynamic visual feature that changes visual content appearing on the user interface display so as to convey the authentication information as the optical signal emitted by the user interface display.

Example 19 includes the method of any one of examples 14-18, further comprising: receiving a short message service (SMS) or multimedia messaging service (MMS) message including a reference to a webpage that is available from the server, the webpage including the information that configures the LED to present the authentication information; and generating the request for the webpage.

Example 20 includes the method of any one of examples 14-18, further comprising generating the request according to a hypertext transfer protocol (HTTP), a hypertext transfer protocol secure (HTTPS), a file transfer protocol (FTP), or a secure file transfer protocol (SFTP).

Example 21 includes the method of example 14, in which the receiving comprises receiving the information through a mobile app software application on the smart device, the information including instructions configuring the mobile app software application to control light emitted by the LED based on the instructions.

Example 22 includes the method of example 21, in which the mobile app software application is a native mobile application, a mobile web application, or a hybrid mobile application.

Example 23 is a computer-readable storage medium having instructions stored thereon that, when performed by a server of authentication information for unlocking an entry point controlled by an electronic locking device, cause the server to: receive through a computer network a request from a smart device acting as a client accessing the server through at least one of a wireless wide area network (WWAN) or a wireless local area network (WLAN), the request associated with the smart device seeking the authentication information by which to unlock the entry point; and provide, in response to the request, information to configure a light-emitting diode (LED) of the smart device so that it emits the authentication information in the form of an optical signal detectable by a photodetector of the electronic locking device.

Example 24 includes the computer-readable storage medium of example 23, further comprising instructions to transmit a set of machine-readable instructions that, when performed by the client, configure a display screen including the LED to change its visual appearance and thereby emit the optical signal.

Example 25 includes the computer-readable storage medium of example 23, in which the client is a mobile app software application.

Example 26 includes the computer-readable storage medium of example 24, in which the mobile app software application is a web browser.

Example 27 includes the computer-readable storage medium of example 23, in which the server is a website server and the information to configure the LED comprises a dynamic image format provided on a webpage of the website server.

Example 28 includes the computer-readable storage medium of example 23, in which the server is a website server and the information to configure the LED comprises a video provided on a webpage of the website server.

Example 29 includes the computer-readable storage medium of example 23, in which the server is a website server and the information comprises a static image provided on a webpage of the website server.

Example 30 includes the computer-readable storage medium of any one of examples 23-29, in which the instructions further configure the server to determine whether access to the entry point is permitted in response to the request.

Example 31 is a method, performed by the electronic locking device of any one of examples 1-13, the method comprising: converting the optical signal to the electrical signal; determining the received authentication information; and actuating a locking component to unlock the entry point.

Example 32 is a smartphone having a machine-readable storage device including machine-readable instructions that configure the smartphone to perform the method of any one of examples 14-22.

Example 33 is a method, performed by a user, of using a smart device to perform the method of any one of examples 14-22.

Example 34 includes the method of example 33, further comprising tapping a link in a text message to access a webpage that provides a flash pattern, in which the webpage is accessible for a predetermined duration.

Any reference in this disclosure to "one embodiment," "an embodiment," "some embodiments," "various embodiments," etc., means that a particular feature, structure, or characteristic described in connection with the embodiment is included in at least one embodiment of this disclosure. The appearances of such phrases, and variations thereof, including references to "implementations," are not necessarily all referring to the same embodiment or implementation. When a particular feature, structure, or element is described in connection with any embodiment or implementation, it is understood that it is within the purview of persons of skill to affect such feature, structure, or element in connection with any of the other embodiments and implementations.

It should be understood that as used in this disclosure and throughout the claims that follow, the phrase "A or B" means any one of (A), (B), or (A and B), which is synonymous with the phrase "A and/or B." Alternatively, just a "/" may be use for conciseness. For example, the phrase "A/B" also means "A or B." The phrase "at least one of A, B, and C" means (A), (B), (C), (A and B), (A and C), (B and C), or (A, B, and C). Further, as used in this disclosure and throughout the claims that follow, the meaning of "in" includes "in" and "on" unless the context clearly prescribes otherwise. The terms "comprising," "having," and "including" are synonymous, unless the context dictates otherwise. As used in this disclosure, the terms "conveying" and "carrying" are described with reference to information included in a communication signal and are synonymous, unless the context dictates otherwise.

Although embodiments have been described with reference to a number of illustrative embodiments and implementations thereof, it will be appreciated that numerous other modifications and embodiments can be devised by skilled persons without departing from the spirit and scope of the underlying principles of this disclosure. The scope of this disclosure should, therefore, be determined only by the following claims.

It is claimed:

1. A method of issuing an access credential for an electronic locking device having an image sensor configured to read optical codes, the method comprising:
   receiving, by a smart device and from an access administration server, an electronic message including a web address to a webpage associated with the electronic locking device;
   transmitting to the access administration server, by a web browser instance on the smart device, a request for the access administration server to configure web resources for rendering the webpage on a display screen of the smart device;
   retrieving, by the access administration server, a machine-readable optical code comprising encoded authentication information including the access credential;
   determining, by the access administration server, whether the smart device is authorized to access the electronic locking device, wherein the determining is based on an access criterion that defines a set of one or more smart devices authorized to access the electronic locking device, and wherein the determining comprises comparing an identifier of the smart device with the set of one or more smart devices authorized to access the electronic locking device;
   responsive to determining that the smart device is authorized to access the electronic locking device, outputting the machine-readable optical code to the webpage; and
   rendering, on the display screen of the smart device, at least a portion of the webpage including the machine-readable optical code that conveys the access credential.

2. The method of claim 1, wherein the image sensor is a complementary metal-oxide-semiconductor (CMOS) image sensor or a charge-coupled device (CCD) image sensor.

3. The method of claim 1, wherein the machine-readable optical code comprises a two-dimensional barcode.

4. The method of claim 1, wherein the machine-readable optical code is formatted according to a standardized barcode symbology selected from a group consisting of a Data Matrix code, a Quick Response (QR) code, and a high capacity color barcode (HCCB) code.

5. The method of claim 1, wherein the identifier comprises at least one of a media access control (MAC) address, a web cookie, or an Internet Protocol (IP) address.

6. The method of claim 1, wherein the access criterion defines a time period during which the smart device is permitted to access the electronic locking device, and wherein the determining comprises comparing the time period with time data associated with the request for the web resource.

7. The method of claim 1, wherein the access criterion defines a single-use access to the electronic locking device, and wherein the determining is further based on whether the smart device previously accessed the webpage or the machine-readable optical code.

8. A server device for managing access rights in an access control system, the server device comprising:
one or more processors; and
memory storing computer-executable instructions that, when executed by the one or more processors, cause the server device to:
receive, from a first user and via a user interface configured to present details related to the access control system, a user input authorizing a second user to access an electronic locking device, the user input including scheduling information related to the second user;
retrieve, from a database, access control information associated with the second user, the access control information comprising an identifier of a smart device associated with the second user and access rights defining the second user's access to the electronic locking device, the access rights including a time period during which access is permitted;
update the access control information in accordance with the user input;
retrieve a machine-readable optical code corresponding to an access credential associated with the electronic locking device; and
transmit, via a communication network to the smart device associated with the second user, an electronic message comprising an instruction for configuring a display screen of the smart device to present the machine-readable optical code.

9. The server device of claim 8, wherein the electronic message is a multimedia message service (MMS) message, and wherein the instruction comprises image data corresponding to the machine-readable optical code.

10. The server device of claim 8, wherein the instruction for configuring the display screen of the smart device comprises a web address to a webpage, and wherein the webpage, when rendered by a web browser application of the smart device, presents the machine-readable optical code on the display screen of the smart device.

11. The server device of claim 8, wherein the machine-readable optical code is formatted according to a standardized barcode symbology selected from a group consisting of a Data Matrix code, a Quick Response (QR) code, and a high capacity color barcode (HCCB) code.

12. An access control system, comprising:
a lock controller comprising an image sensor, the lock controller configured to generate an unlocking signal in response to the image sensor detecting a machine-readable optical code corresponding to an access credential associated with the lock controller;
a locking device communicatively coupled to the lock controller, the locking device having a locked position and an unlocked position, the locked position characterized by the locking device restricting access to an entry point, the locking device configured to change, in response to the unlocking signal, from the locked position to the unlocked position that permits access to the entry point;
a smart device of a user seeking access to the entry point, the smart device having a display screen for presenting the machine-readable optical code; and
a server device comprising:
one or more processors; and
memory storing computer-executable instructions that, when executed by the one or more processors, cause the server device to perform operations including:
maintaining, in a database, web resources for configuring a webpage hosted by the server device, the webpage for providing access control information including the access credential associated with the lock controller;
receiving, via a communication network and from a web browser application executing on the smart device, an electronic message comprising a request to configure the webpage for display on the display screen of the smart device;
applying an access criterion to the request that indicates whether the user is permitted to access the entry point, wherein the access criterion is satisfied when biometric information received at the smart device indicates that the user is a member of a set of one or more authorized users;
generating, responsive to the access criterion being satisfied, the machine-readable optical code corresponding to the access credential; and
outputting the machine-readable optical code to the webpage for presenting on the display screen of the smart device.

13. The access control system of claim 12, wherein the locking device is communicatively coupled to the lock controller via an electrical connection or a wireless connection.

14. The access control system of claim 12, wherein the lock controller is remote from the locking device.

* * * * *